(12) United States Patent
Barbulescu et al.

(10) Patent No.: US 10,699,834 B2
(45) Date of Patent: Jun. 30, 2020

(54) ELECTROMAGNETIC LOCKING DEVICES, SYSTEMS, AND METHODS

(71) Applicant: LORD Corporation, Cary, NC (US)

(72) Inventors: Stefan Barbulescu, Fuquay-Varina, NC (US); Richard Wilder, Moncure, NC (US); Joshua Fishman, Raleigh, NC (US); Michael Trull, Apex, NC (US); Askari Badre-Alam, Cary, NC (US)

(73) Assignee: LORD Corporation, Cary, NC (US)

( * ) Notice: Subject to any disclaimer, the term of this patent is extended or adjusted under 35 U.S.C. 154(b) by 3 days.

(21) Appl. No.: 15/743,805

(22) PCT Filed: Jul. 21, 2016

(86) PCT No.: PCT/US2016/043338
§ 371 (c)(1),
(2) Date: Jan. 11, 2018

(87) PCT Pub. No.: WO2017/015461
PCT Pub. Date: Jan. 26, 2017

(65) Prior Publication Data
US 2018/0204659 A1 Jul. 19, 2018

Related U.S. Application Data

(60) Provisional application No. 62/222,953, filed on Sep. 24, 2015, provisional application No. 62/195,033, (Continued)

(51) Int. Cl.
*H01F 7/18* (2006.01)
*F15B 15/10* (2006.01)
(Continued)

(52) U.S. Cl.
CPC ............ *H01F 7/1805* (2013.01); *F15B 15/10* (2013.01); *F15B 15/262* (2013.01); *F16H 19/04* (2013.01);
(Continued)

(58) Field of Classification Search
CPC ...... H01F 7/081; H01F 7/1607; H01F 7/1805; H01F 27/28; H01F 27/24
(Continued)

(56) References Cited

U.S. PATENT DOCUMENTS 2,998,552 A * 8/1961 Ray ........................ H01F 7/1607
335/247
6,182,942 B1 * 2/2001 Kadlicko .............. F15B 21/087
251/129.1
(Continued)

FOREIGN PATENT DOCUMENTS

DE 196 27 925 1/1998
DE 10 2008 049915 4/2010

*Primary Examiner* — Shawki S Ismail
*Assistant Examiner* — Lisa N Homza
(74) *Attorney, Agent, or Firm* — Jenkins, Wilson, Taylor & Hunt, P.A.

(57) ABSTRACT

Electromagnetic locking devices, systems, and methods are provided. The electromagnetic locking devices, systems, and methods are configured to lock an actuating arm of an actuator in any desired position between and including a fully extended position and a fully retracted position with respect to an outer cover of the electromagnetic locking device and/or system. The electromagnetic locking devices, systems, and methods described herein may include an unpowered deformable member that imparts fail-safe functionality thereto.

2 Claims, 14 Drawing Sheets

Related U.S. Application Data filed on Jul. 21, 2015, provisional application No. 62/195,069, filed on Jul. 21, 2015.

(51) Int. Cl.

| | | |
|---|---|---|
| *H01F 7/08* | (2006.01) | |
| *H01F 7/121* | (2006.01) | |
| *F15B 15/26* | (2006.01) | |
| *F16H 19/04* | (2006.01) | |
| *F16H 21/44* | (2006.01) | |
| *H01F 7/16* | (2006.01) | |
| *H01F 27/24* | (2006.01) | |
| *H01F 27/28* | (2006.01) | |
| *H01F 7/06* | (2006.01) | |
| *F16D 65/16* | (2006.01) | |

(52) U.S. Cl.
CPC ............ *F16H 21/44* (2013.01); *H01F 7/081* (2013.01); *H01F 7/121* (2013.01); *H01F 7/1607* (2013.01); *H01F 27/24* (2013.01); *H01F 27/28* (2013.01); *F16D 65/16* (2013.01); *H01F 7/066* (2013.01)

(58) Field of Classification Search
USPC .......................................................... 335/228
See application file for complete search history.

(56) References Cited

U.S. PATENT DOCUMENTS

| | | | |
|---|---|---|---|
| 6,202,806 B1 | 3/2001 | Sandrin et al. | |
| 6,378,671 B1 | 4/2002 | Carlson | |
| 6,598,621 B1* | 7/2003 | Wygnanski | ........... F16K 31/003 |
| | | | 137/624.18 |
| 6,837,478 B1* | 1/2005 | Goossens | ................ B60T 8/363 |
| | | | 251/129.15 |
| 2005/0030136 A1* | 2/2005 | Babich | ...................... H01F 3/02 |
| | | | 335/220 |
| 2006/0145545 A1* | 7/2006 | Reichert | ............. F16K 31/0624 |
| | | | 310/14 |
| 2012/0256110 A1 | 10/2012 | Legaspi | |
| 2018/0346128 A1* | 12/2018 | Kozlowski | .............. F16K 41/12 |

* cited by examiner

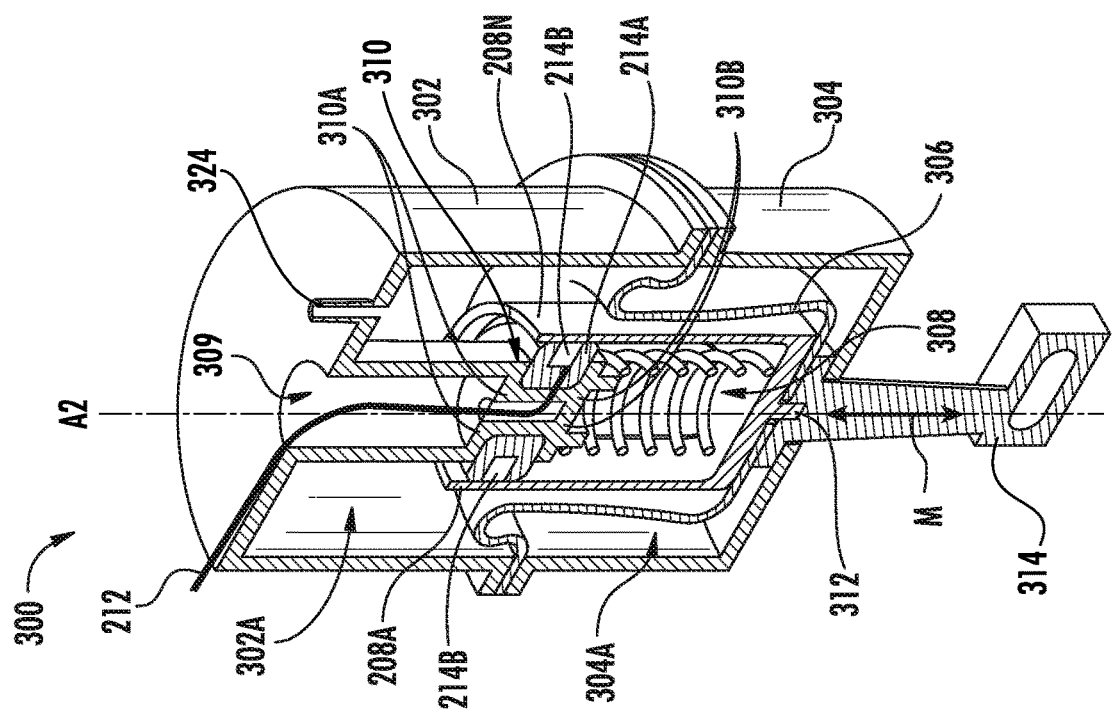
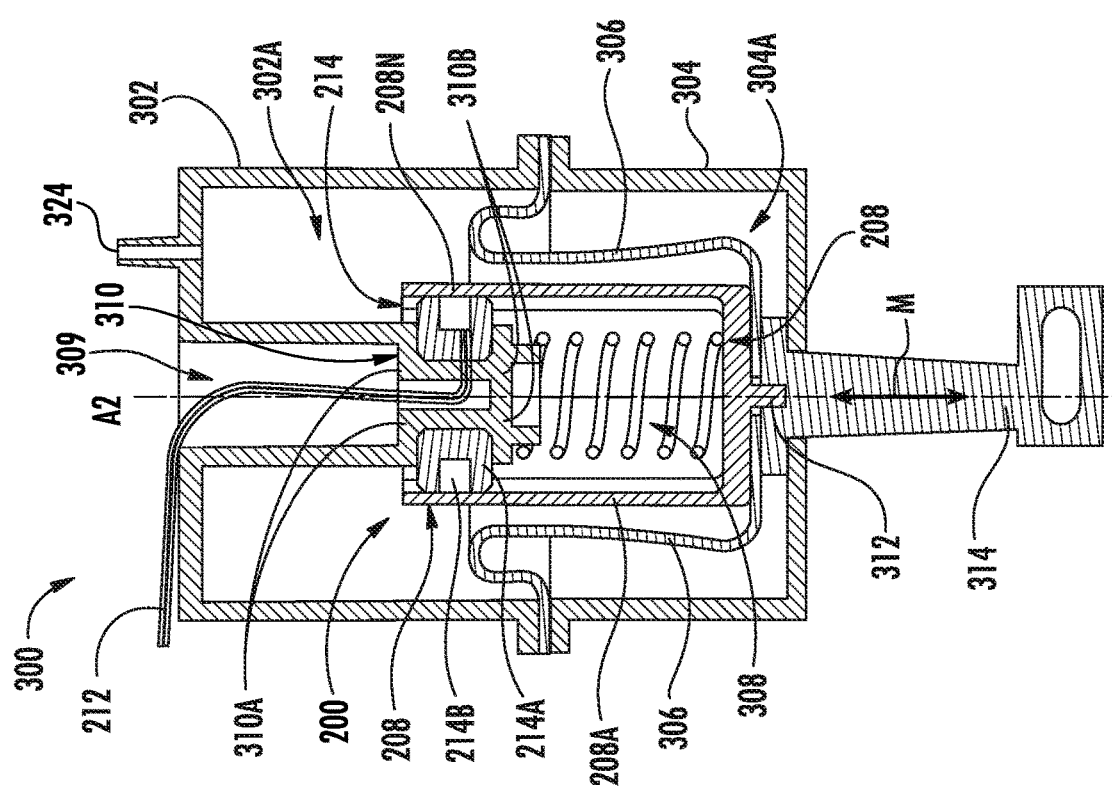
FIG. 3B
FIG. 3A

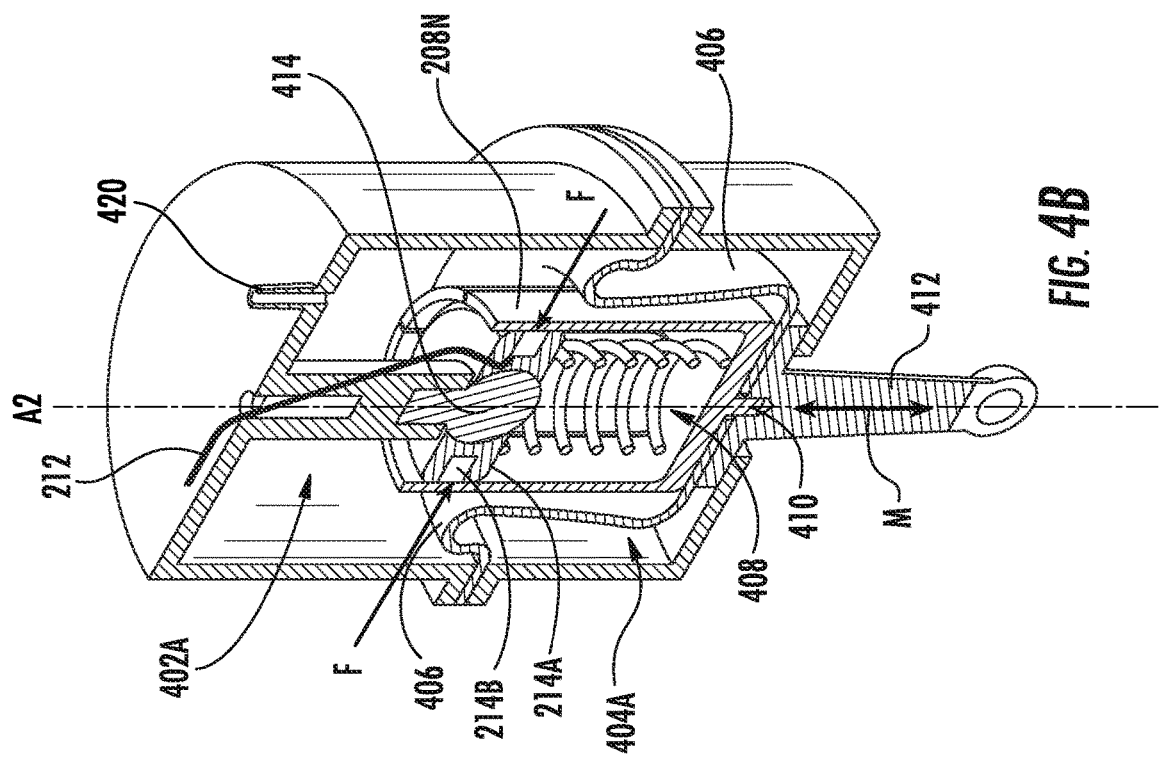
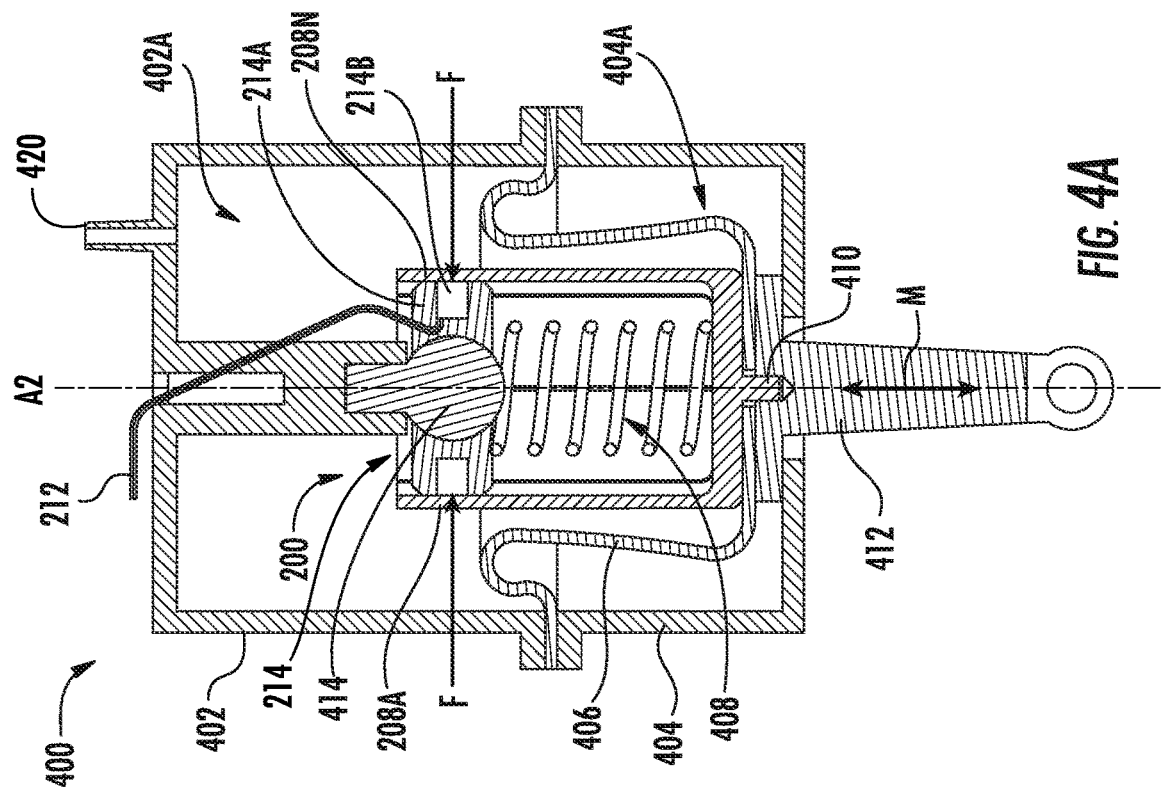

ELECTROMAGNETIC LOCKING DEVICES, SYSTEMS, AND METHODS

CROSS-REFERENCE TO RELATED APPLICATIONS

This application relates to and claims priority to U.S. Provisional Patent Application Ser. No. 62/195,069, filed on Jul. 21, 2015, U.S. Provisional Patent Application Ser. No. 62/195,033, filed on Jul. 21, 2015, and U.S. Provisional Patent Application Ser. No. 62/222,953, filed on Sep. 24, 2015, the disclosures of which are incorporated by reference herein in their entireties.

TECHNICAL FIELD

The subject matter herein relates generally to electromagnetic locking devices, systems, and methods, and more particularly, to electromagnetic locking devices, systems, and methods for precision locking of actuated devices.

BACKGROUND

Modern vehicles incorporate different types of actuators for driving different types of devices, or portions thereof. For example, modern vehicles may include actuated valves, dampers, compressors, cylinders, exhaust components, pumps, engine components, or the like.

Currently, a magnetic locking (braking) device may be used to provide position control of an actuated device via locking the position of an actuating arm that is driving the device. Conventional locking devices are of commercially limited value, as they can only lock the position of the actuated device, or portions thereof, in one extreme state or another, namely in a purely "on" or "off" state and/or a purely "open" or "closed" state. This is problematic, as manufacturers lack the ability to vary and/or lock the position of actuated devices anywhere between the two extreme states.

Accordingly, a need exists for providing improved electromagnetic locking devices, systems, and methods, which can brake, lock, and/or otherwise hold the position of an actuated device at various positions between extreme states (e.g., between fully open and/or fully closed states).

SUMMARY

Electromagnetic locking devices, systems, and methods are described herein. In one aspect, an electromagnetic locking device comprises a housing (e.g., a cylinder) defining a cavity, the housing including at least one slot disposed therein for providing at least one movable tab portion. The device further comprises at least one driving rod disposed proximate to the housing, the driving rod being linearly movable and/or displaceable with respect to the housing between and including a fully extended position and a fully retracted position with respect to the housing. The device further comprises a magnetic field generator disposed in the cavity of the housing. The magnetic field generator comprises a magnetic core and a coil disposed about the magnetic core. The magnetic field generator is configured to generate a magnetic field when energized with electrical current, and the magnetic field magnetically attracts the at least one tab portion towards the coil for locking the driving rod in any desired position between and including the fully extended position and the fully retracted position. Energizing the coil generates the magnetic field which attracts the core and the housing to generate a frictional holding force that restricts the linear motion of the driving rod.

In another aspect, a method of locking a driving member via an electromagnetic locking device is provided. The method comprises providing a housing with a cavity (e.g., a hollow cylinder), providing at least one slot in the housing for defining at least one movable tab portion, providing at least one driving member proximate to the housing, and providing a magnetic field generator in the cavity of the housing. The driving member is linearly movable and/or displaceable between and including a fully extended position and a fully retracted position with respect to the housing. The magnetic field generator comprises a magnetic core and a coil disposed about the magnetic core. The method further comprises energizing the magnetic field generator with electrical current for generating a magnetic field, wherein the magnetic field magnetically attracts the at least one tab portion towards the coil for locking the driving member in any desired position between and including the fully extended position and the fully retracted position.

In another aspect, an electromagnetic locking system is provided. The electromagnetic system comprises a movable device; an actuator comprising at least one driving rod, the at least one driving rod being configured to drive the movable device; and an electromagnetic locking device attached to a portion of the actuator. The electromagnetic locking device comprises a housing (e.g., a cylinder) and a magnetic field generator disposed within a portion of the housing. The magnetic field generator is configured to generate a magnetic field, wherein the magnetic field generates an electromagnetic force for locking the driving rod in any desired position between and including a fully extended position and a fully retracted position with respect to the housing. The system further comprises a spring member disposed within a portion of the housing. The spring member is configured to automatically move the at least one driving rod to the fully extended position or fully retracted position when the electromagnetic locking device is devoid of electrical power.

In another aspect, an electromagnetic locking system is provided. The system comprises an outer cover, an elastomeric diaphragm, a spring ledge, a spring, an actuating arm, a magnetic field generator, a housing, and an external control input. The outer cover comprising a first cover member and a second cover member. The elastomeric diaphragm being disposed between the first and second cover members, thereby defining first and second chambers, one on each side of the elastomeric diaphragm. The spring ledge being secured between an inner edge of the elastomeric diaphragm and a planar surface of a housing. The system spring comprising a first end which is positioned on the spring ledge and a second end is positioned on an upper wall of the first cover member. The magnetic field generator affixed to a center structure comprising the first and second ledge portions which are integral with, or otherwise attached to, the first cover member, the magnetic field generator comprising a magnetic core and a coil which is positioned about the magnetic core, the coil being configured to generate a magnetic field when an electrical current is applied. The housing having a center axis, a substantially covered first end in a shape of a planar surface, a substantially open second end, and walls comprising a plurality of slots longitudinally positioned through at least a portion of the housing wall, thereby defining a plurality of movable tab portions, the housing being of a magnetically responsive material. The external control input configured to provide the electrical current to the coil. Wherein a proximal end of actuating arm is attached to an attachment member and wherein a distal end of actuating arm is slidably disposed through a hole in a bottom of second cover member. Wherein the magnetic field magnetically attracts the plurality of movable tab portions towards the coil to generate a frictional force to brake any movement of the rod.

In still another aspect, an electromagnetic locking system is provided. The system comprising a first cover member, a center structure, a magnetic field generator, a housing, a spring, an attachment member, a second cover member, an elastomeric diaphragm, an actuating arm and an external control input. The center structure is rigidly secured to the first cover member, the center structure comprising first and second ledge portions. The magnetic field generator is affixed to the center structure, the magnetic field generator comprising a magnetic core with a coil positioned about the magnetic, the coil being configured to generate a magnetic field when an electrical current is applied. The housing having side walls, a bottom planar surface, and a center axis, the side walls extending from the planar surface with the cylinder opening upward, wherein the side walls are proximately positioned around the magnetic field generator, the side walls being movable relative to the coil, wherein the side walls comprise a plurality of slots which are longitudinally positioned through at least a portion of the side walls, thereby defining a plurality of movable tab portions, and wherein the cylinder comprises a magnetically responsive material. The spring being disposed within the housing between second ledge portion and the planar surface of the housing. The attachment member being affixed to a bottom surface of the planar surface, the attachment member being aligned with the center axis. The second cover member surrounding at least a portion of the housing. The elastomeric diaphragm being disposed between the first and second cover members, the attachment member extending through and below the elastomeric diaphragm. The actuating arm being attached to the attachment member and extending through the second cover member. The external control input configured to provide an electrical input to the coil, wherein the magnetic field generates an electromagnetic braking by magnetically attracting the plurality of movable tab portions towards the magnetic field generator, wherein the electromagnetic braking brakes any movement of the housing.

In yet another aspect, an electromagnetic locking system is provided. The system comprising a first cover member, a center structure, a ball joint, a magnetic field generator, a housing, a spring, an attachment member, a second cover, an elastomeric diaphragm, an actuating arm, and an external control input. The center structure being rigidly secured to the first cover member. The ball joint being secured to the center structure. The magnetic field generator being affixed to the ball joint, the magnetic field generator having a magnetic core with a coil positioned about the magnetic core, the coil being configured to generate a magnetic field when an electrical current is applied. The housing having side walls, a bottom planar surface, and a center axis, the side walls extending from the planar surface with the housing opening upward, wherein the side walls are proximately positioned around the magnetic field generator, the side walls being movable relative to the coil, wherein the side walls have a plurality of slots which are longitudinally positioned through at least a portion of the side walls, thereby defining a plurality of movable tab portions, and wherein the housing comprises a magnetically responsive material. The spring being disposed within the housing between the ball joint and the planar surface of the housing. The attachment member being affixed to a bottom surface of the planar, the attachment member being aligned with the center axis. The second cover member surrounding at least a portion of the housing. The elastomeric diaphragm being disposed between the first and second cover members, the attachment member extending through and below the elastomeric diaphragm. The actuating arm being attached to the attachment member and extending through the second cover member, wherein the second cover member allows for the housing and magnetic field generator to pivot relative to the center structure. The external control input being configured to provide an electrical input to the coil, wherein the magnetic field generates an electromagnetic braking by magnetically attracting the plurality of movable tab portions towards the magnetic field generator, wherein the electromagnetic braking brakes any movement of the housing In a further aspect, an electromagnetic system comprises a vacuum actuator integrated with an electromagnetic locking device. The system comprises an upper first cover member configured for a vacuum to be generated therein; an elastomeric diaphragm disposed within the upper first cover member; a rod mount secured to an inner edge of the elastomeric diaphragm; a spring; a driving rod having a ball joint on a rod first end, the ball joint being secured to the rod mount; a magnetic field generator affixed to the driving rod proximate a second end thereof, the magnetic field generator having a magnetic core with a coil (e.g., a coil winding) circumferentially positioned about the magnetic core and in electrical communication with the magnetic field generator, the coil being configured to generate an electromagnetic field when an electrical current is applied. The system further comprises a housing (e.g., a cylinder) having a center axis, a substantially covered first end, a substantially open second end, and a wall with a plurality of slots longitudinally positioned through at least a portion of the housing wall, thereby creating a plurality of movable tab portions; the housing comprises a magnetically responsive material.

The driving rod is slidably disposed through a hole in the substantially covered first end of the housing, with the ball joint being positioned externally from the housing interior. The system further comprises a second rod affixed to the driving rod second end; the housing being positioned about the driving rod, magnetic field generator, and housing, wherein the second rod is slidably disposed through at least a portion of the housing; a bearing positioned about the driving rod and being located between an outer surface of the driving rod and an inner surface of the substantially covered first end of the housing and being configured to provide for slidable movement between the driving rod and the housing. The system further comprises an external control input configured to provide an electrical input to the coil, the coil providing an electromagnetic braking by magnetically attracting the tab portions towards the magnetic field generator, wherein the electromagnetic braking is configured to brake any relative movements between the driving rod and the housing.

In a further aspect, an embodiment comprises a linear brake system comprising an first cover member configured to have a vacuum applied in a first chamber therein; a center structure rigidly secured to the first cover member; a magnetic field generator affixed to the center structure, the magnetic field generator having a magnetic core with a coil (e.g., a coil winding) circumferentially positioned about the magnetic core and in electrical communication with the magnetic field generator, and the coil being configured to generate an electromagnetic field when an electrical current is applied. The system further comprises a housing (e.g., a cylinder) having side walls, a bottom, and a center axis, the side walls extending from the bottom with the housing opening upward, wherein the side walls are proximately positioned around the magnetic field generator, the side walls being movable relative to the coil, wherein the side walls have a plurality of slots longitudinally positioned through at least a portion of the side wall, thereby creating a plurality of movable tab portions, and the housing comprising a magnetically responsive material.

The system further comprises a spring disposed within the housing between an end of the center structure and the bottom of the housing; an attachment member affixed to the bottom of the housing, the attachment member being aligned with the center axis; a lower second cover member surrounding at least a portion of the housing; an elastomeric diaphragm having an interior edge sealably secured to a bottom side of the bottom of the housing and an exterior edge sealably secured between flanges of the first and second cover members, an attachment member extending through and below the elastomeric diaphragm; an actuating arm attached to the attachment member and extending through the second cover member; and an external control input configured to provide an electrical input to the coil, the coil providing an electromagnetic braking force by magnetically attracting the tab portions towards the magnetic field generator, wherein the electromagnetic braking force serves to brake any movement of the housing.

In a further aspect, an embodiment comprises a linear brake system. The system comprises an upper first cover member configured for a vacuum to be generated therein; a center structure rigidly secured to the first cover member; a ball joint (e.g., a pivot device, generally) secured to the center structure; a magnetic field generator affixed to the ball joint, the magnetic field generator comprising a magnetic core with a coil (e.g., a coil winding) circumferentially positioned about the magnetic core and in electrical communication with the magnetic field generator, the coil being configured to generate an electromagnetic field when an electrical current is applied. The system further comprises a housing (e.g., a cylinder) having side walls, a bottom, and a center axis, the side walls extending from the bottom with the housing opening upward, wherein the side walls are proximately positioned around the magnetic field generator, the side walls being movable relative to the coil, wherein the side walls have a plurality of slots longitudinally positioned through at least a portion of the side wall, thereby creating a plurality of movable tab portions, and the housing comprising a magnetically responsive material.

The system further comprises a spring disposed within the housing between the ball joint device and the bottom of the housing; an attachment member affixed to the bottom of the housing, the attachment member being aligned with the center axis; a second cover member surrounding at least a portion of the housing; having an interior edge sealably secured to a bottom side of the bottom of the housing and an exterior edge sealably secured between flanges of the first and second cover members, an attachment member extending through and below the elastomeric diaphragm. The system further comprises an actuating arm, the actuating arm being attached to the attachment member and extending through a centrally positioned hole in the second cover member, the centrally positioned hole being configured to allow the housing and magnetic field generator to pivot relative to the center structure. The system further comprises an optional external control input configured to provide an electrical input to the coil, the coil providing a magnetic force by magnetically attracting the tab portions towards the magnetic field generator, wherein the resulting normal force/friction braking is configured to brake any movement of the housing.

As described herein, a magnetic field generator comprising a core and coil generates a magnetic field, and a resultant magnetic force between the housing and the core pulls the housing tabs towards the core and/or coil. As a result, a high normal force is created between the two metal surfaces (e.g., the tabs and coil/core) thereby causing a high frictional force (i.e., locking or braking movement) in the axial direction.

Objects and advantages of the subject matter will become apparent as the following detailed description of the preferred embodiments is read in conjunction with the drawings, which illustrate such embodiments.

BRIEF DESCRIPTION OF THE DRAWINGS

FIGS. 3A through 3D are various views illustrating a further embodiment of an electromagnetic locking device and/or system.

FIGS. 4A through 4D are various views illustrating a further embodiment of an electromagnetic locking device and/or system.

DETAILED DESCRIPTION

Figure 1A:
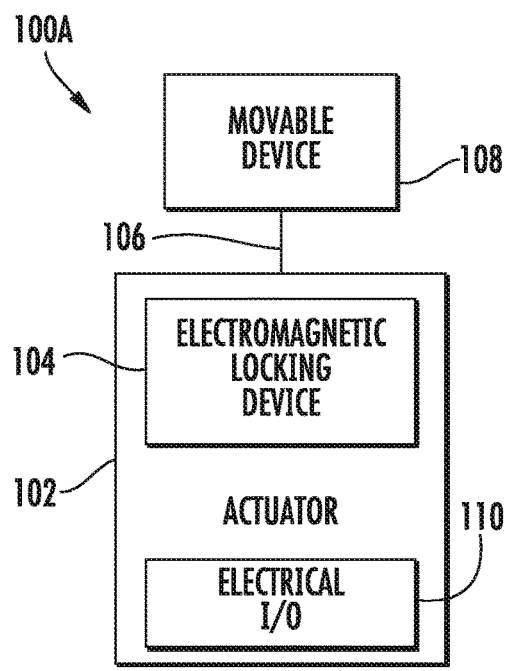
FIGS. 1A and 1C are schematic diagrams of electromagnetic locking devices and systems.

FIGS. (also "FIGS.") 1A through 7 illustrate various views, aspects, and/or features associated with electromagnetic locking devices, systems, and related methods. In some embodiments, the electromagnetic locking devices, systems, and methods set forth herein are configured to adjust, change, and/or lock the position of an actuated (i.e., movable) device to any desired position between and including two extreme states, such as any position between and including a purely "open" state and a purely "closed" state. Devices, systems, and methods provided herein may also be "fail-safe," meaning that the locking device will automatically revert the position of the actuated device to a default or "safe" position upon a power loss and/or electrical failure of a component associated with the devices and/or systems described herein.

In some embodiments, the electromagnetic locking devices, systems, and methods described herein include a magnetically permeable housing 208 that moves relative to an electromagnetic field generator 214 (e.g., a coil assembly) as described, for example, in col. 4, line 54, to col. 5, line 14, of commonly owned and assigned U.S. Pat. No. 6,378,671, the entire disclosure of which is hereby incorporated herein by reference. The magnetic housing 208 includes at least one slot 202, and in some aspects, an array of slots as described, for example, in col. 5, lines 51 to 64, of commonly owned and assigned U.S. Pat. No. 7,243,763, the entire disclosure of which is hereby incorporated herein by reference.

In some embodiments, the housing includes slots 202 that allow the housing 208 to flex and constrict radially when a magnetic field is generated and applied thereto upon directing electrical current through a magnetic field generator 214, as described, for example, in col. 6, lines 20 to 47, of commonly owned and assigned U.S. Pat. No. 6,640,940, the entire disclosure of which is hereby incorporated herein by reference. In so doing, an inner surface 206 of the housing 208 squeezes or constricts against an outer surface of the magnetic field generator 214 with a normal force that is a function of the magnitude of the applied magnetic field as described, for example, in col. 6, lines 33 to 59, of commonly owned and assigned U.S. Pat. No. 7,637,360, the entire disclosure of which is hereby incorporated herein by reference. Thus, the housing 208 acts like a magnetically actuated collet that squeezes or constricts against a rod or piston to resist relative movement therebetween. The magnitude of the applied magnetic field may be substantially proportional to the electrical current supplied to the coil. As described herein, the holding force may depend on the magnetic field produced by providing electrical current to the magnetic field generator 214.

Electromagnetic locking devices and systems described herein may be devoid of multiple bearings and/or gears, which are otherwise recited as being present therein. The electromagnetic locking devices and systems provided herein may be sealed from the outside via a single bearing (e.g., bearing 218 shown in FIGS. 2A to 2C) or seal, but may be devoid of additional bearings. The electromagnetic locking devices and systems provided herein may be operable at high and low temperatures, for example, between and including temperatures of at least −40° C. to about 220° C. Those having ordinary skill in the art will recognize that the temperature range in which the present devices and systems are operable can be adjusted selectively through the use of coil wire insulation material or other known mechanisms for temperature control.

The actuators described herein may include any type of driving component, device, or member. Non-limiting examples of actuators include servo motors, electrical motors, a human input, electrical actuators, mechanical actuators, electromechanical actuators, pneumatic actuators, hydraulic actuators, vacuum actuators, diaphragm-type actuators, thermal actuators, magnetic actuators, etc., and/or any combination thereof.

The actuated (i.e., driven) devices described herein may include any movable device, component, or member within a vehicle and/or vehicular system. Non-limiting examples of such actuated devices include valves, gears, dampers, compressors, cylinders, exhaust components, pumps, engine components, pistons, etc., and/or any combination thereof.

Figure 1B:
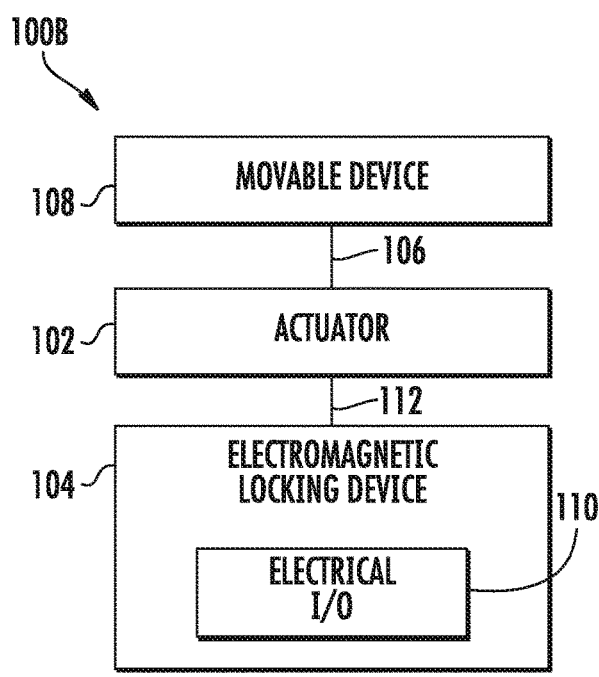
Figure 1C:
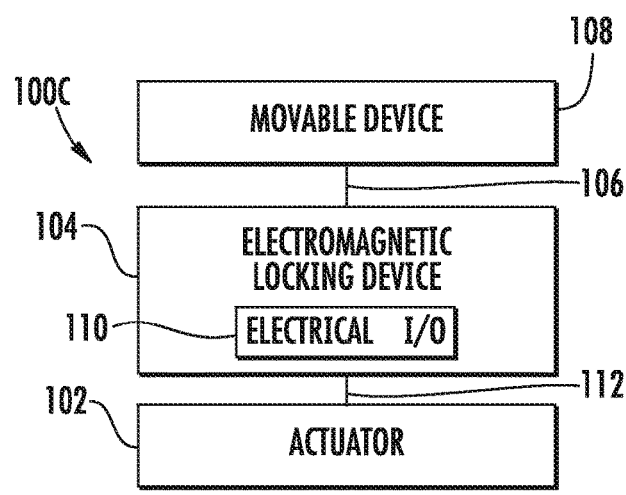

FIGS. 1A to 1C are schematic diagrams illustrating exemplary electromagnetic locking systems, generally designated 100A, 100B, and 100C, respectively. Wherever possible, the same reference numbers will be used throughout the drawings to refer to the same or like parts.

Referring to FIG. 1A, and in a first exemplary embodiment of an electromagnetic locking system 100A, portions of an electromagnetic locking device 104 are integrated within an actuator 102. Actuator 102 and electromagnetic locking device 104 are disposed within a same housing, container, chamber, and/or vessel. In some embodiments, portions of actuator 102 are connected, linked, joined, attached and/or otherwise mechanically coupled to portions of locking device 104 for locking, braking, holding, or otherwise disabling movement of a movable device 108 upon application of electrical current. Actuator 102 may include any type or combination of types of actuating device, not limited to vacuum actuators, electrical actuators, mechanical actuators, hydraulic actuators, thermal actuators, pneumatic actuators, or the like.

In some embodiments, actuator 102 is configured to induce movement to a movable device 108 via a driving or actuating member 106, such as a piston, rod, or actuating arm. Actuating member 106 is disposed between actuator 102 and movable device 108. Actuator 102 is configured to generate and apply an actuating force to drive actuating member 106, which in turn drives and/or otherwise induces movement of movable device 108. Actuator 102 induces linear, rotational, axial, torsional, and/or pivotal movement to moveable device 108 upon generation of the actuating force.

Electromagnetic locking device 104 is configured to generate and apply a holding force. The holding force is greater than the actuating force to portions of actuator 102 for locking actuating member 106 and movable device 108 attached thereto in any desired position. In some embodiments, electromagnetic locking device 104 is configured to generate and apply a holding force to lock movable device 108 in any desired position and/or state, for example, between and including a purely "open" and a purely "closed" state for improving the performance capabilities and/or properties associated with a respective movable device 108.

Still referring to FIG. 1A and in some embodiments, system 100A includes an electrical input/output (I/O) interface or connection 110. Electrical I/O connection 110 is configured to receive and pass a controlled amount of electrical current to electromagnetic locking device 104. In response to receiving the electrical current, electromagnetic locking device 104 generates a magnetic field for attracting a magnetically responsive material to simultaneously lock actuating member 106 and movable device 108 in a desired position by generating a frictional holding force between portions of system 100. In some embodiments, electromagnetic locking device 104 is configured to provide precise position control via substantially instantaneous and/or simultaneous locking of actuating member 106 and movable device 108 in any desired position between and including a "on" and "off" position, for example, between an "open" and "closed" position. Electromagnetic locking device 104 is configured to stop (e.g., lock or brake) movement of movable device 108 at any position in between and including the start and stop positions.

In one non-limiting example, movable device 108 includes a valve (e.g., an exhaust valve or a butterfly valve) used in a vehicle exhaust system. Electromagnetic locking member 104 is configured to lock the position of the valve in an open state, a closed state, or any desired position therebetween. Locking the valve in different positions may be desirable to increase performance of the exhaust system, the vehicle, and/or reduce noise, where desired.

FIG. 1B illustrates another embodiment of an electromagnetic locking system 100B. System 100B includes a non-integrated design in which a discrete electromagnetic locking device 104 may be provided and connected to an existing actuator 102, but which is not integrated therewith, and also to a movable device 108. In this embodiment, a physical, electrical, magnetic, or mechanical linking member 112 connects electromagnetic locking device 104 to actuator 102. Linking member 112 may include a rod, a bar, a yoke, a pin, a hook, a joint, a seal, a post, bolt, or any other fastener or connector. Electromagnetic locking device 104 is configured to generate a holding force externally from actuator 102, and then to apply the holding force to portions of actuator 102, for example, actuating member 106, thereby providing precise position control of the movable device 108 that is being driven by actuating member 106.

FIG. 1C illustrates another embodiment of an electromagnetic locking system 100C. System 100C includes a non-integrated design in which a discrete electromagnetic locking device 104 may be provided and connected to an existing actuator 102 and a movable device 108. In this embodiment, linking member 112 connects electromagnetic locking device 104 to actuator 102 and electromagnetic locking device 104 also connects to actuating member 106. Linking member 112 may include a rod, a bar, a yoke, a pin, a hook, a joint, a seal, a post, bolt, or any other fastener or connector. Electromagnetic locking device 104 is configured to generate a holding force externally from actuator 102, and then apply the holding force to actuating member 106, thereby providing precise position control of the movable device 108 that is being driven by actuating member 106.

Systems 100A to 100C are configured to provide high-resolution (i.e., "infinitely variable") position control of different types of movable devices 108 including, but not limited to, valves, switches, dampers, compressors, cylinders, exhaust components, pumps, engine components, or the like.

In some embodiments, systems 100A to 100C may further include an unpowered device, for example, a spring, a deformable member, an elastomeric member, or the like, disposed within a portion of electromagnetic locking device 104. The unpowered device imparts fail-safe functionality to locking device 104, as locking device 104 is thus configured automatically to revert the movable device 108 to a default or "safe" position in the event of a power loss or any type of damage. In some embodiments, in the non-limiting example of movable device 108 including a valve, the "safe" position may include an "open" position that allows exhaust gases to escape through the open valve automatically in the event of an electrical failure of the vehicle and/or any component of systems 100A to 100C.

It will be appreciated that FIGS. 1A to 1C are provided for illustrative purposes only and that various parts, their locations, and/or their functionalities described above in relation to each figure may be changed, altered, added, or removed.

Figure 2A:
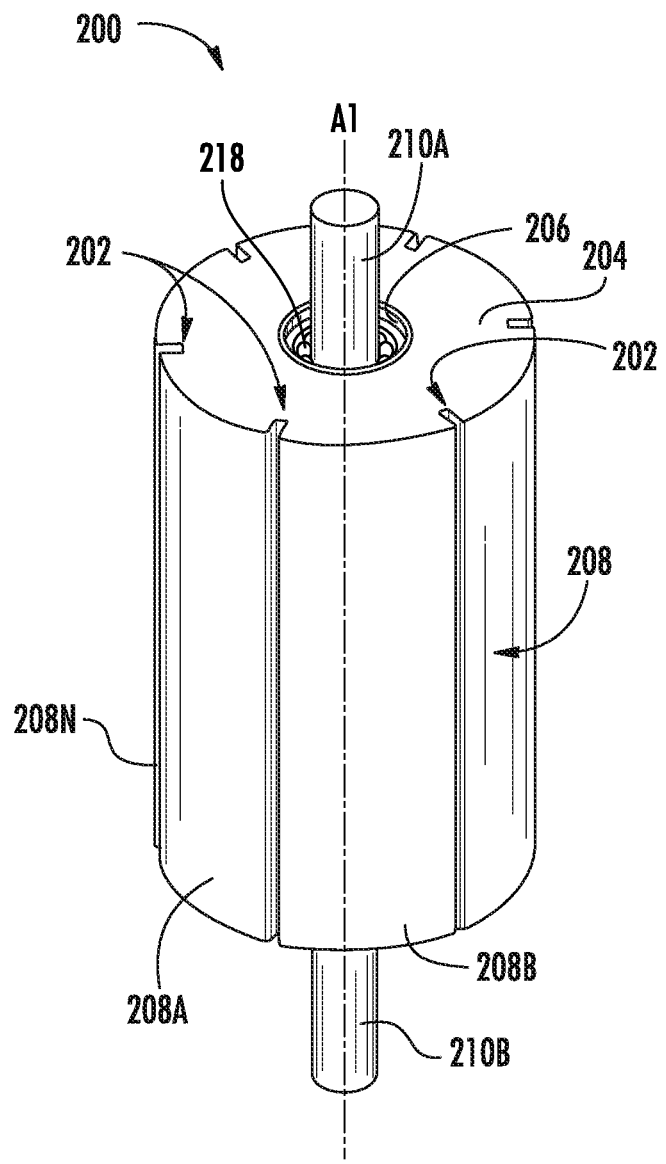
FIGS. 2A through 2C are various views illustrating an embodiment of an electromagnetic locking device and/or system.
Figure 2B:
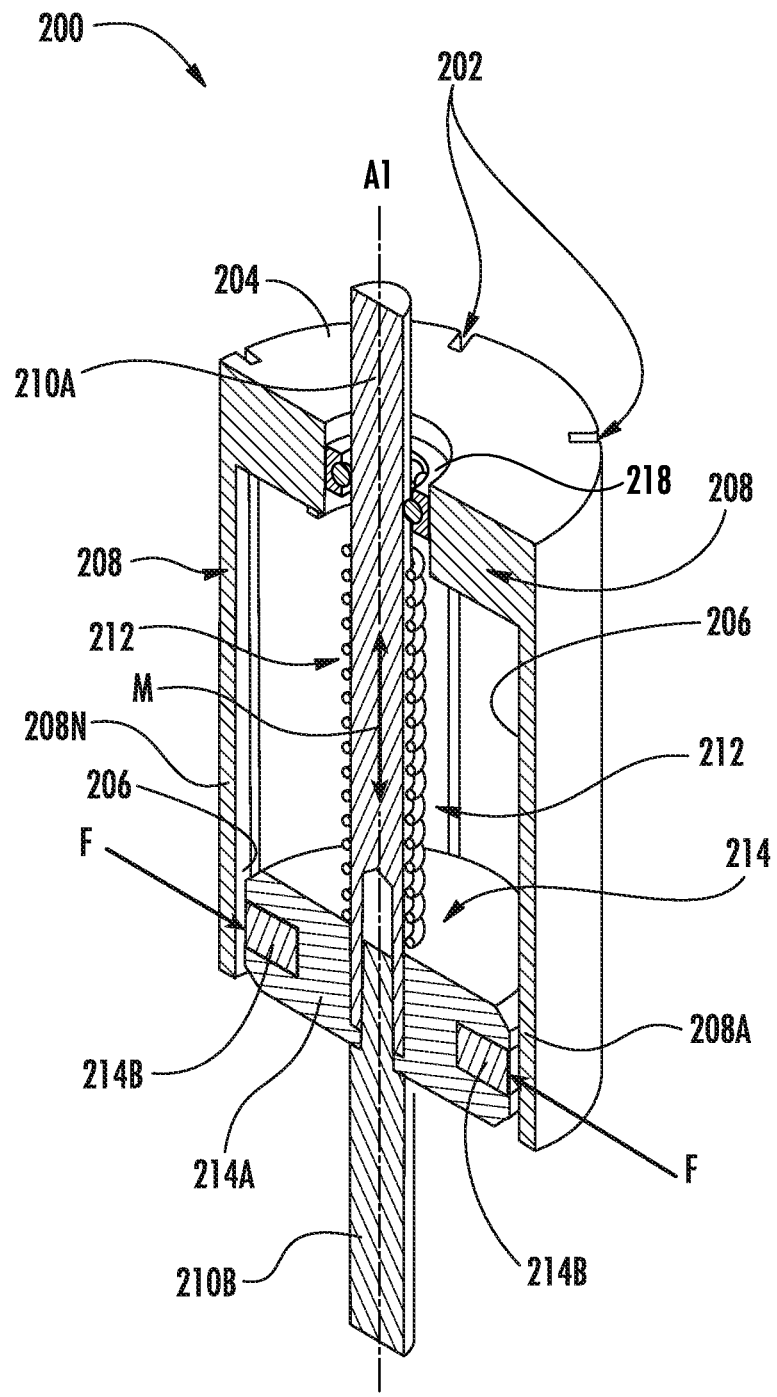
Figure 2C:
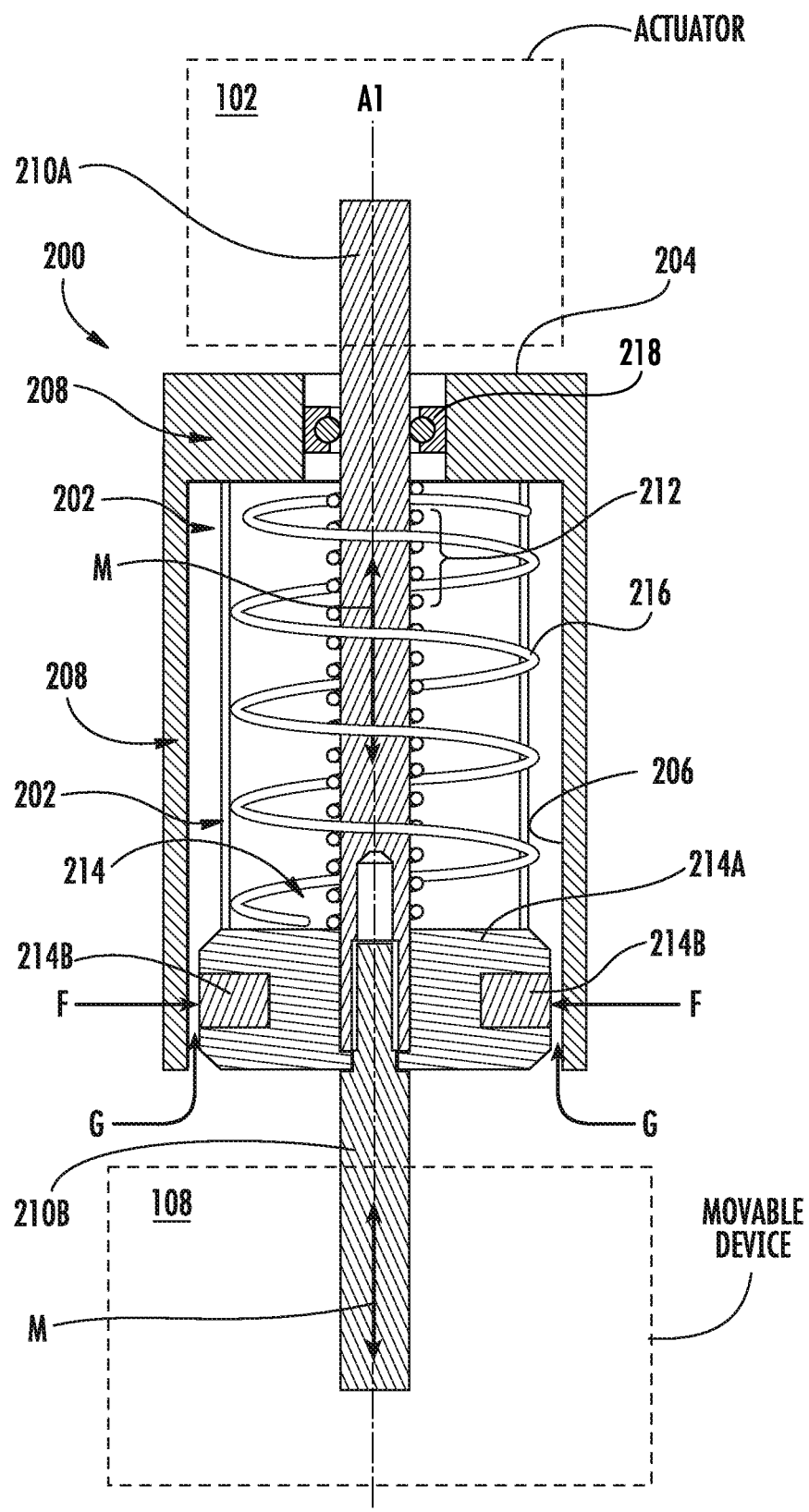

FIGS. 2A through 2C are various views illustrating an embodiment of an electromagnetic locking device, generally designated 200, and/or portions thereof. FIGS. 2A to 2C illustrate an embodiment of a discrete electromagnetic locking device 200 that is attachable to an actuator 102 and/or a movable device 108, as schematically illustrated in FIG. 1B or 1C. Referring to FIG. 2A, electromagnetic locking device 200 comprises a housing 208 having a planar surface 204, an inner wall 206, a center axis A1, and at least one slot 202 in housing 208. At least one magnetic field generator 214 is disposed between a driving rod 210A and portions of housing 208 and is configured to generate a magnetic field when energized with electrical current.

Referring generally to FIG. 2A, and in some embodiments, housing 208 is disposed about and/or includes at least one driving member, such as a driving rod provided proximate thereto, and in some aspects, the driving rod extends therethrough. In some embodiments and as shown in FIGS. 2A through 2C, a driving rod 210A and a second rod 210B extend from, and are disposed at least partially within a portion of housing 208. In some aspects, the driving rod is attached to planar surface 204 of housing 208. Housing 208 is shown comprising a substantially cylindrical or tubular shape, however, any sectional shape may be provided. For Example, FIGS. 6A through 6E show various sectional shapes for the housing, including a triangular housing 220, a hexagonal housing 222, a square housing 224, a rectangular housing 226, and an octagonal housing 228. In some embodiments, driving rod 210A and second rod 210B may include driving pistons, driving members, or connectors that are configured to connect to an actuator (e.g., 102, FIGS. 1A to 1C), a movable member (e.g., 108, FIGS. 1A to 1C), and/or any portion thereof (e.g., 106, FIGS. 1A to 1C). A magnetic field generator 214 is configured to lock a position of a movable member by generating a holding force (e.g., a braking or locking force) that constricts housing 208 about the magnetic field generator (e.g., 214, FIG. 2B) disposed about driving rod 210A and/or second rod 210B.

Still referring to FIG. 2A and in some embodiments, housing 208 comprises a magnetically responsive material comprising iron, nickel, ceramics, chrome, cobalt, a ferromagnetic material (e.g., gadolinium), steel, or the like. Housing 208 includes a planar outer (e.g., upper or lower) surface 204 and at least one slot 202 disposed in housing 208. In some embodiments and as shown in FIGS. 2A through 2D, housing 208 includes a plurality of slots 202 disposed at regular intervals about the circumference of housing 208. In some embodiments, slots 202 may be spaced in irregularly about the perimeter of housing 208 and/or be elongated and extend substantially parallel to a center axis A1 of housing 208. Slots 202 may extend along one or more planes that are substantially orthogonal to planar surface 204. Slots 202 are configured to divide housing 208 into one or more elongated portions or tab portions 208A, 208B, to 208N (wherein "N" is a whole number integer greater than 2), which allow housing 208 to flex and constrict radially when a magnetic field is applied to magnetic field generator 214. In doing so, an inner wall 206 and/or inner surfaces of housing 208 and/or tabs 208A to 208N squeezes or constricts against an outer surface of the magnetic field generator (e.g., 214, FIG. 2B) to resist relative movement therebetween, and apply a holding or braking force to an actuating member (e.g., 106, FIG. 1A), or a portion thereof, attached thereto. Application of a holding or braking force to an actuating member locks a movable device that is attached to the actuating member in a desired position.

In some embodiments, tabs 208A to 208N are configured such that the elongated portion is substantially a same or similar width along a longitudinal axis A2 of electromagnetic locking device 200. For example, FIGS. 2A through 2C illustrate tabs 208A to 208N each having elongated portions that are substantially a same or similar width along a longitudinal axis A2 of electromagnetic locking device 200. In other embodiments (not shown), tabs 208A to 208N may be configured such that the elongated portion is varied in width along a longitudinal axis A2 of electromagnetic locking device 200. For example, tabs 208A to 208N may be slightly tapered so that the elongated portions comprise a width that is greater towards driving rod 210A and less wide towards second rod 210B. In another exemplary embodiment, tabs 208A to 208N may be slightly tapered so that the elongated portions comprise a width that is greater towards second rod 210B and less wide towards driving rod 210A. Additionally, planar surface 204 can be located at a top of housing 208 substantially adjacent to driving rod 210A, a bottom of housing 208 substantially adjacent second rod 210B, or at some position therebetween.

Moreover, in some embodiments (not shown), tabs 208A to 208N may be individually mounted to housing 208 rather than being integrally formed with housing 208 by slots 202.

For example, tabs 208A to 208N may be individually mounted to planar surface 204 of housing 208 by one or mechanism including, but not limited to, a flexible joint, a hinge, a screw, a spring, or the like. In other examples, tabs 208A to 208N may be individually mounted to planar surface 204 of housing 208 by being embedded in a flexible material, such as a plastic or any other like polymer or similar material. In this manner, individual mounting of tabs 208A to 208N to housing 208 may advantageously increase a gap G disposed between housing 208 and magnetic field generator 214, thereby allowing housing 208 to further flex and constrict radially when an electrical current is applied to magnetic field generator 214, than when tabs 208A to 208N are merely defined by integrally formed slots 202 without a magnetic field being generated by magnetic field generator 214.

FIGS. 2B and 2C are sectional views of electromagnetic locking device 200. Referring to FIG. 2C, device 200 includes a magnetic field generator 214 (e.g., a coil assembly) disposed within housing 208. Housing 208 includes at least one slot 202 disposed therein. Slots 202 extend from a planar surface 204 and along substantially a full length of housing 208. Slots 202 are substantially parallel about a circumference of housing 208, for providing at least one movable tab portion 208A. In some aspects, a plurality of tab portions 208A to 208N is provided in housing 208. Tab portions 208A to 208N become magnetically attracted towards a magnetic field generator 214 upon application of electrical current to magnetic field generator 214.

Magnetic field generator 214 comprises a magnetic core 214A and a coil 214B disposed about the magnetic core 214A. Magnetic core 214A is a magnetically responsive material, comprising a ferromagnetic material, iron, nickel, ceramics, chrome, cobalt, steel, or the like. Coil 214B includes a coil winding (not shown individually) that is wrapped about a circumferential perimeter of magnetic core 214A. Although one coil 214B is shown, multiple coils 214B may be provided about an outer circumference of magnetic core 214A. An electrical current is applied to coil 214B via an electrical current carrier, such as a wire 212. Wire 212 may be wrapped about and/or extend along an actuating member such as a driving rod 210A, where desired. Driving rod 210A extends from an actuator 102 (shown schematically in FIG. 2C), and is linearly movable with respect to housing 208 for driving a movable device attached to second rod 210B. The linear motion M of driving rod 210A is substantially parallel to a longitudinal axis A2 of electromagnetic locking device 200.

In some embodiments, a holding force applied to maintain device 200 in a specific position is variable by changing a coefficient of friction between housing 208 and magnetic core 214A. The coefficient of friction may be changed in many ways, one of which is through altering a material composition of each of housing 208 and magnetic core 214A. More particularly, different materials will have different effects on the coefficient of friction between housing 208 and magnetic core 214A. For example, housing 208 and magnetic core 214A may be comprised of a ferromagnetic material, iron, nickel, ceramics, chrome, cobalt, steel, or the like. Additionally, the coefficient of friction may be changed through a plating process. More particularly, for example, one or both of housing 208 and magnetic core 214A is plated to enhance the coefficient of friction therebetween. Furthermore, the coefficient of friction may be changed by altering the surface finish or by applying a surface coating or texture to one or both of housing 208 and magnetic core 214A. More particularly, the surfaces of either one or both of housing 208 and magnetic core 214A are adjusted for enhanced breaking of the holding force between housing 208 and magnetic core 214A.

Still referring to FIGS. 2B and 2C, driving rod 210A may include an actuating member, such as an actuating arm, that extends from an actuator 102 (shown schematically, e.g., in FIG. 2C). Driving rod 210A may be physically attached or connected to a second rod 210B. In alternative configurations (not shown), driving rod 210A and second rod 210B may be opposing ends of the same rod 210 where rod 210 is a unitary rod 210. In the embodiment illustrated in FIGS. 2B and 2C, second rod 210B is attachable to a movable device 108 (shown schematically, e.g., in FIG. 2C), such as a valve, or any other movable device. The actuator is configured to move driving rod 210A linearly in a linear direction or motion M, which also extends and/or retracts second rod 210B with respect to housing 208. As current passes into coil 214B, tabs 208A to 208N are magnetically attracted towards magnetic core 214A of magnetic field generator 214, such that inner surfaces or walls 206 of tabs 208A to 208N radially constrict about magnetic field generator 214 and generate a magnetic force F, also referred to as a frictional holding force. The magnetic force F is configured to create a normal frictional force between housing 208 and magnetic field generator 214 to lock or "brake" the position of each rod (e.g., 210A and 210B) in any desired position between and including a fully extended position and a fully retracted position with respect to housing 208. Energizing coil 214B generates a magnetic force between magnetic core 214A and housing 208 to generate a frictional holding force that restricts the linear motion M of driving rod 210A and second rod 210B.

FIG. 2C schematically illustrates the placement of an actuator 102 and a movable device 108, each of these components being schematically illustrated in broken lines. Each of these components may include any one of many different types/designs of components as provided by any given manufacturer, and are not limited to any single type of actuator 102 and/or movable device 108. Actuator 102 may include a servo motor, an electrical motor, a human input, a vacuum actuator, a pneumatic actuator, an electrical actuator, a hydraulic actuator, or the like, for moving driving rod 110A. Movable device 108 may include a valve, a compressor, a pump, an exhaust component, a motor component, a fluid carrying component, or the like, optionally disposed within a vehicular system.

As FIG. 2C illustrates, actuator 102 disposed externally from device 200, so that device 200 externally generates a magnetic force F to brake, hold, and/or lock a position of the actuating member (e.g., arm, or driving rod 210A) as tabs 208A to 208N constrict and press against magnetic field generator 214. The pressure exercised by tabs 208A to 208N against the core assembly (e.g., 214) will provide the braking (locking) effect that stops the linear motion of driving rod 210A and second rod 210B.

In some embodiments, the actuator is configured to linearly displace driving rod 210A for driving a movable device 108 (e.g., a valve) via second rod 210B. Magnetic force F may be generated as current passes through wire 212 and into coil 214B. Force F causes tabs 208A through 208N to magnetically attract inwardly towards magnetic field generator 214, thereby locking the movement of driving rod 210A and second rod 210B, respectively.

In some embodiments, a gap G is disposed between housing 208 and magnetic field generator 214, for example, between tabs 208A through 208N and magnetic field generator 214. For example, a gap G between about 0.01 to about 1 mm (e.g., 0.25 mm, 0.5 mm, 0.75 mm, etc.) is provided between tabs 208A to 208N and magnetic field generator 214. However, gap G is scalable depending on a size of magnetic field generator 214 employed, such that gap G may be larger or smaller than approximately 0 to 1 mm depending on the application required. Magnetic field generator 214 is configured to generate a magnetic field when energized with electrical current, and the magnetic field magnetically attracts the at least one tab portion 208A towards the coil 214B to eliminate gap G. The magnetic attraction between housing 208 and magnetic core 214A generates a frictional holding force that restricts the linear motion of each rod (e.g., 210A and 210B) in any desired position between and including a fully extended position (e.g., open position) and a fully retracted position (e.g., closed position), with respect to housing 208. Magnetic field generator 214 and/or housing 208 may be held stationary, or each may be movable within a separate outer shell (see, e.g., 302 and 304 in FIGS. 3A through 3D). Any design is contemplated.

Still referring to FIG. 2C and in some embodiments, actuator 102 is connected to driving rod 210A via a connector assembly (not shown) such as a ball joint, a pin, a yoke, a rod, a hook, or any other type of fastener or connector. In some embodiments, the magnitude of the magnetic field generated via magnetic field generator 214 depends upon the amount of current passing through wire 212. In some embodiments, magnetic force F is configured to provide precise position locking of each rod 210A and 210B between and including extreme positions (e.g., fully extended and fully retracted positions with respect to housing 208).

Electromagnetic locking device 200 is configured to lock each rod 210A and 210B nearly instantaneously. For example, device 200 is configured to lock each rod 210A and 210B approximately between about 0.01 and about 30 milliseconds (ms). Magnetic field generator 214 has a fast response time (e.g., about 0.01 to about 5 ms) from the point of receiving a command to generating the magnetic field. Electromagnetic locking device 200 is a small, compact device that delivers a high-force density suitable for incorporation within vehicular systems. As is apparent to one of skill in the art, however, response time of electromagnetic locking device 200 is scalable depending on the application of the electromagnetic locking device 200 and the size of the components implemented therein.

As FIG. 2C further illustrates and in some embodiments, an unpowered component 216 is disposed within a portion of housing 208 for automatically moving the at least one driving rod to a fail-safe position when the device is devoid of electrical power. Unpowered component 216 may include any type of deformable member, such as a spring, an elastomeric component, or the like, for imparting fail-safe capabilities and providing a fail-safe electromagnetic locking device 200. In some embodiments, component 216 includes a spring that forces the actuating member and movable device driven thereby into a "safe" position, such as a fully open position in the event of an electrical power loss. Thus, each rod 210A and 210B becomes unlocked from any position in the event of a power or electrical failure. That is, unpowered component 216 is configured to automatically extend the at least one driving rod when device 200 is devoid of electrical power.

In some embodiments, electromagnetic locking device 200 comprises a lubricant (e.g., oil, grease) disposed at least between an interface of the magnetic field generator 214 and the housing 208 to modify functionality of the device (i.e., to reduce 'stiction,' or the difference between the coefficients of static and dynamic friction that occurs as magnetic field generator 214 and/or housing 208 begin to move from stationary position), as well as in order to improve controllability (i.e., response time) of the device. For example, a more lubricated system is capable of responding quicker because the coefficient of static friction will be similar to the coefficient of dynamic friction, thereby requiring a lower initial actuating force to overcome the static friction acting between magnetic core 214A and housing 208 and thereby induce movement thereof requiring lesser actuating forces to overcome the coefficient of static friction than is possible without lubricant being provided.

It will be appreciated that FIGS. 2A through 2C are for illustrative purposes only and that various parts, their locations, and/or their functionalities described above in relation to each figure may be changed, altered, added, or removed without deviating from the presently described subject matter.

Figure 3C:
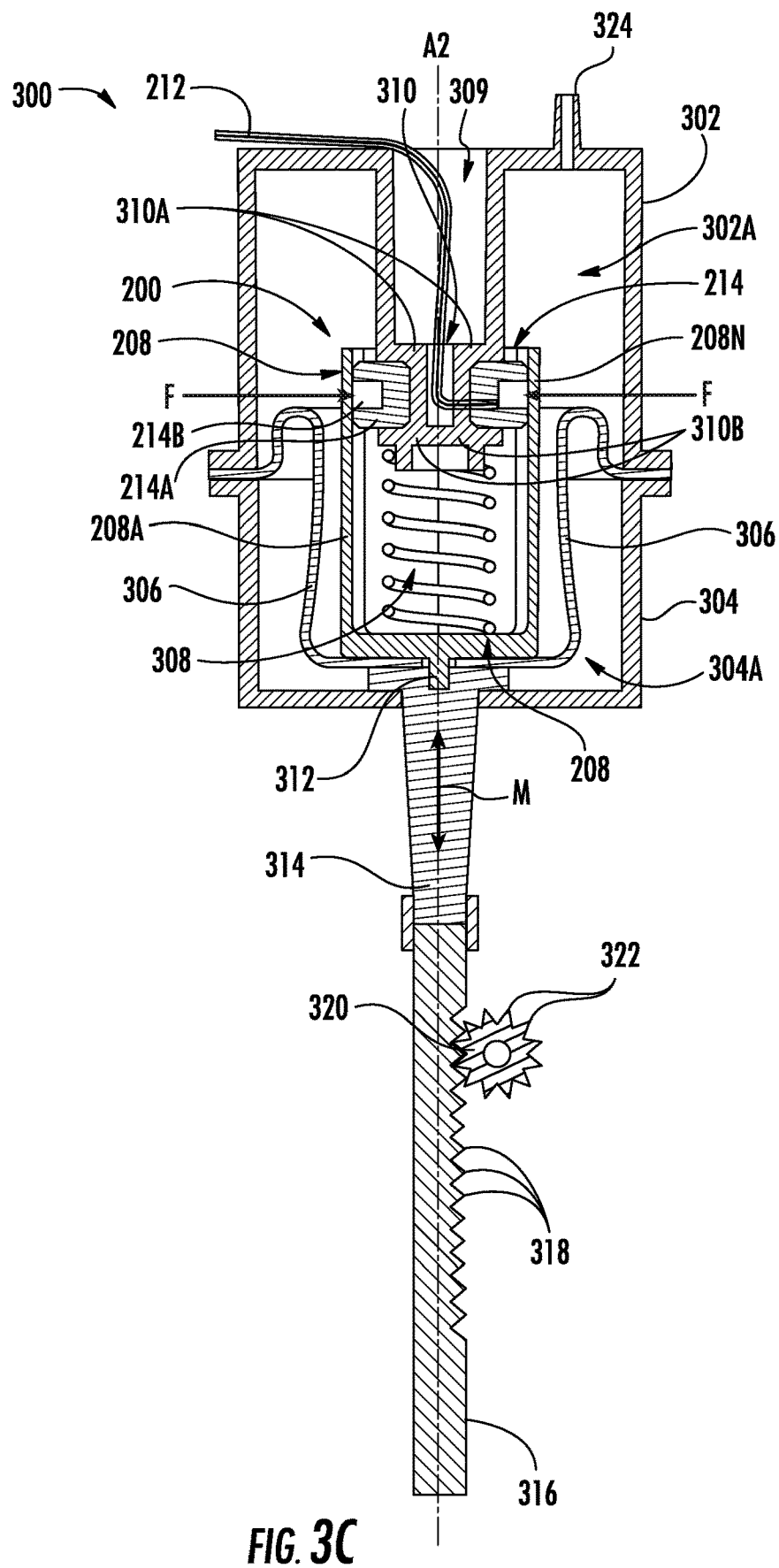

FIGS. 3A through 3D are various views illustrating a further embodiment of an electromagnetic locking system, generally designated 300. FIGS. 3A and 3B illustrate an embodiment of an electromagnetic locking system having an electromagnetic locking device 200, as schematically illustrated in FIG. 1A. Electromagnetic locking system 300 includes an outer cover comprising a first cover member 302 and a second cover member 304. An elastomeric diaphragm 306 is disposed between first cover member 302 and second cover member 304. Elastomeric diaphragm 306 thus separates electromagnetic locking system 300 into a first chamber 302A and a second chamber 304A. According to this embodiment, first cover member 302 comprises a vacuum port 324 which is connected to a vacuum actuator (not shown) for altering a pressure inside the first chamber 302A. As a pressure differential between first and second chambers 302A and 304A, respectively, changes, elastomeric diaphragm 306 flexes towards whichever chamber has a lesser pressure value in order to retract or extend a driving rod attached thereto, such as actuating arm 314. Actuating arm 314 is linearly movable (e.g., via linear motion M) with respect to the first and second cover members 302 and 304 and a longitudinal axis A2 of electromagnetic locking system 300.

Electromagnetic locking device 200 may be disposed between portions of elastomeric diaphragm 306 and attached to actuating arm 314 for locking actuating arm 314 in any desired position between and including a fully extended and a fully retracted position within electromagnetic locking system 300. A proximal end of actuating arm 314 is configured to attach to a post, a fastener, or any other type of attachment member 312 extending from housing 208. A distal end of actuating arm 314 is configured to attach to a movable device 108 (not shown), such as a valve, or the like. Linear motion M may also be referred to as a "stroke" that linearly drives actuating arm 314 and movable device 108 connected thereto, and responds to linear movement of housing 208 with respect to magnetic field generator 214.

Magnetic field generator 214 is configured to generate an electromagnetic force F upon electrical current passing to coil 214B via wire 212. Electromagnetic force F causes tab portions 208A to 208N of housing 208 to constrict and/or otherwise flex inwardly and lock or press against at least portions of magnetic field generator 214, as housing 208, or the tab portions thereof 208A to 208N, come(s) magnetically in contact with magnetic core 214A. The magnitude of the magnetic field generated via magnetic field generator 214 is a function of (e.g., to a point of saturation) an amount of current that passes through coil 214B, and will lock actuating arm 314 in a desired position as the frictional holding force between housing 208 and coil 214B overcomes the actuating force generated via a vacuum actuator (not shown), which comprises diaphragm 306.

In some embodiments, magnetic field generator 214 is held stationary within electromagnetic locking system 300. In other embodiments, magnetic field generator 214 is movable within electromagnetic locking system 300. Variations to the design are contemplated. In a non-limiting embodiment, magnetic field generator 214 is held stationary by a center structure 310 comprising a first ledge portion 310A and a second ledge portion 310B, each of which are integrally formed with, or otherwise affixed to, first cover member 302. First and second ledge portions 310A and 310B may be disposed within and/or below a portion of a cavity 309. Housing 208 is linearly movable within system 300, for example, parallel to and/or along a longitudinal axis A2 of electromagnetic locking system 300.

The position of housing 208, and actuating arm 314 attached thereto, is lockable in a variety of different positions upon excitation of coil 214B. In some aspects, movement of actuating arm 314 opens and closes a valve (e.g., movable device 108). The valve may be locked at any desired position between and including a fully open and a fully closed position, according to a position sensor and/or controller (not shown). Electromagnetic locking system 300 comprises an actuator 102 integrated with an electromagnetic locking assembly or device 200 for locking an actuating arm 314 at any one of an infinite number of positons for providing precise position control of a movable member 108 attached thereto (e.g., a valve).

Still referring to FIGS. 3A and 3B, electromagnetic locking system 300 includes fail-safe functionality by using an unpowered spring 308 positioned therein. In some embodiments, spring 308 is disposed within a portion of housing 208 so that, upon a loss of electrical power and/or other damage thereto, spring 308 may automatically decompress and extend to push actuating arm 314 to a fully extended position. In one non-limited embodiment, pushing actuating arm 314 to a fully extended position opens a valve attached thereto, and allows gases (e.g., exhaust fumes) to be released and/or expressed from the exhaust system automatically, even in the event of malfunction or power loss. Although not shown in the figures, spring 308 may alternatively be disposed externally to housing 208 and connected thereto in order to provide the same functionality as the spring 308 is disposed within a portion of housing 208.

In some embodiments, electromagnetic locking system 300 comprises a lubricant (e.g., oil, grease) disposed at least in first chamber 302A to modify functionality of the system (i.e., to reduce 'stiction,' or the difference between the coefficients of static and dynamic friction that occurs as actuating arm 314 extends and/or decompresses between a fully extended and a fully closed position), as well as in order to improve controllability (i.e., response time) of the system. For example, a more lubricated system is capable of responding quicker because the coefficient of static friction will be similar to the coefficient of dynamic friction, thereby requiring a lower initial actuating force (e.g., generated by the pressure differential induced by the vacuum actuator) to overcome the static friction acting between magnetic core 214A and housing 208 and thereby induce movement of the actuating arm 314.

It will be appreciated that FIGS. 3A and 3B are for illustrative purposes only and that various parts, their locations, and/or their functionalities described above in relation to each FIG. may be changed, altered, added, or removed.

Figure 3D:
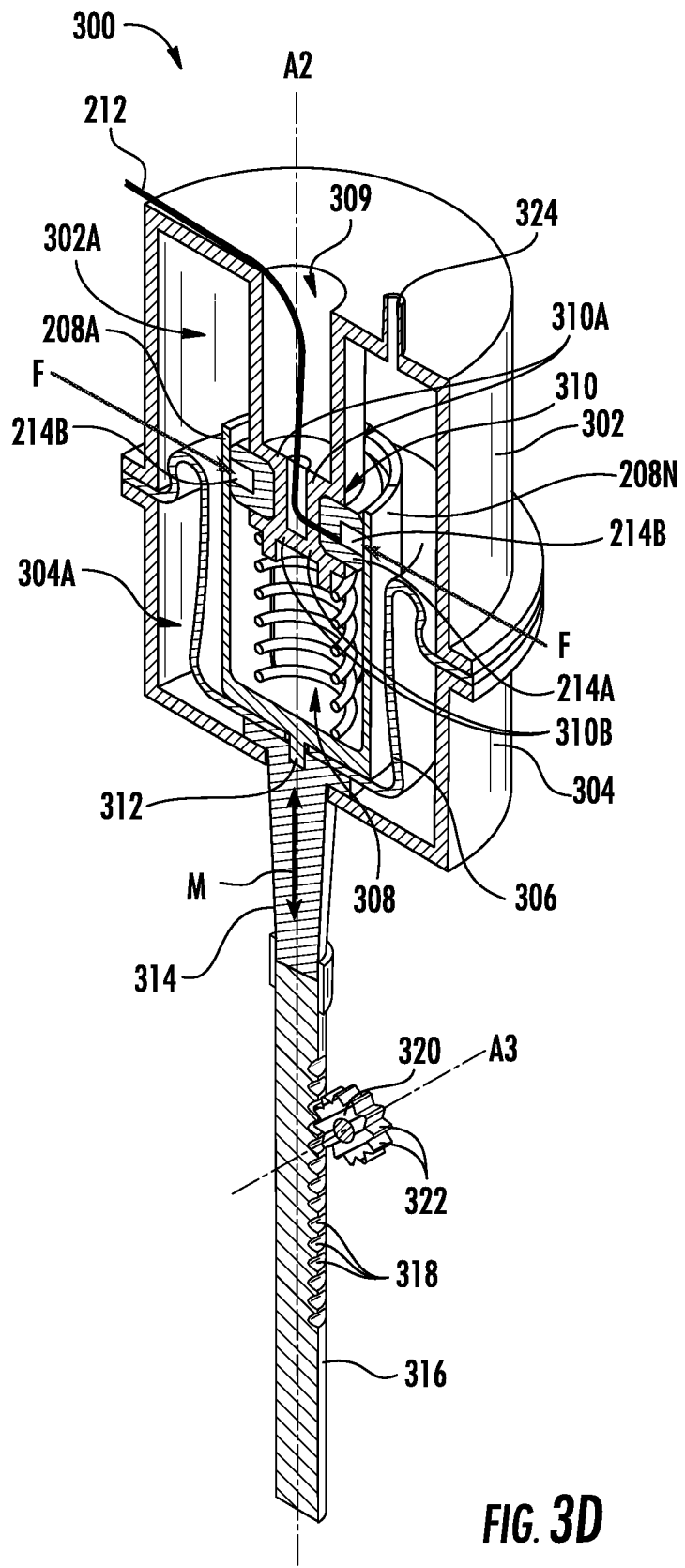

Referring now to FIGS. 3C and 3D, a further embodiment of the electromagnetic locking system 300 is illustrated. However, unlike FIGS. 3A and 3B, which illustrate actuating arm 314 being configured to attach to a movable device 108, FIGS. 3C and 3D illustrate actuating arm 314 being configured to attach to or otherwise being integrated with a rack and pinion arrangement that is attached to a movable device (not shown). Rack 316 includes a plurality of rack teeth 318, while a pinion 320 includes a plurality of pinion teeth 322 circumferentially positioned about an outer edge; the plurality of pinion teeth 322 are configured to mesh with the plurality of rack teeth 318. Pinion 320 is coupled to a movable device or other mechanism for rotation together about a common central axis A3. In this way, movement of rack 316 caused by operation of a stroke or linear motion M of actuating arm 314 causes pinion 320 to rotate, which thereby rotates the movable device.

It will be appreciated that FIGS. 3C and 3D are for illustrative purposes only and that various parts, their locations, and/or their functionalities described above in relation to each FIG. may be changed, altered, added, or removed without deviating from the subject matter of the present invention.

FIGS. 4A and 4B are various views illustrating a further embodiment of an electromagnetic locking system, generally designated 400. FIGS. 4A and 4B illustrate another embodiment of an electromagnetic locking system 400 comprising an electromagnetic locking device 200, as schematically illustrated in FIG. 1A. Electromagnetic locking system 400 includes an outer cover comprising a first cover member 402 and a second cover member 404. An elastomeric diaphragm 406 is disposed between and fixed by flanges of first and second cover members 402 and 404, respectively. Elastomeric diaphragm 406 separates electromagnetic locking system 400, thereby defining a first chamber 402A and a second chamber 404A on either side of elastomeric diaphragm 406. According to this embodiment, first cover member 402 comprises a vacuum port 420, which is connected to a vacuum actuator (not shown), for altering a pressure inside the first chamber 402A. As a pressure differential between the first and second chambers 402A and 404A, respectively, changes, elastomeric diaphragm 406 flexes towards whichever chamber has a lesser pressure value in order to retract or extend a driving rod attached thereto, such as actuating arm 412.

In some embodiments, actuating arm 412 is provided proximate to housing 208, and in some aspects actuating arm 412 is attached to housing 208 via a rod, post, or attachment member 410. Actuating arm 412 is linearly movable (e.g., via linear motion M) with respect to the first and second cover members 402 and 404 and a longitudinal axis A2 of electromagnetic locking system 400. As elastomeric diaphragm 406 flexes between first chamber 402A and second chamber 404A, housing 208 and actuating arm 412 attached thereto are linearly movable within electromagnetic locking system 400. Electromagnetic locking device 200 is configured to lock housing 208 and actuating arm 412 in any one of an infinite number of positions between and including a fully extended position and a fully retracted position with respect to housing 208, upon energizing coil 214B. Energizing coil 214B generates an electromagnetic force F between magnetic core 214A and housing 208 to generate a frictional holding force that restricts linear motion M of actuating arm 412.

Electromagnetic locking device 200 is disposed between portions of elastomeric diaphragm 406 and attached to actuating arm 412 for locking actuating arm 412 in any desired position between and including a fully extended and a fully retracted position within electromagnetic locking system 400. A proximal end of actuating arm 412 is configured to attach attachment member 410 of housing 208. A distal end of actuating arm 412 is configured to attach to a movable device (not shown), such as a valve, or the like. A linear, stroking motion of actuating arm 412 drives the movable device connected thereto in response to linear movement of housing 208 with respect to magnetic field generator 214.

Magnetic field generator 214 is configured to generate an electromagnetic force F upon electrical current passing to coil 214B via wire 212. Electromagnetic force F causes tab portions 208A through 208N of housing 208 to constrict and/or otherwise flex inwardly and lock or press against magnetic core 214A, as housing 208, or at least tab portions thereof 208A to 208N, magnetically contacts magnetic core 214A. The magnitude of electromagnetic force F generated by magnetic field generator 214 is a function of an amount of electrical current passed through coil 214B, and will lock actuating arm 412 in a position as the holding force overcomes the actuating force generated via elastomeric diaphragm 406, as vacuum actuator (not shown) varies the pressure in first chamber 402A.

In some embodiments, magnetic field generator 214 is held stationary within electromagnetic locking system 400. In other embodiments, magnetic field generator 214 is movable within electromagnetic locking system 400. Variations to the design are contemplated. In a non-limiting embodiment, magnetic field generator 214 is held stationary via a bearing or a ball joint 414. Ball joint 414 may comprise a rounded, substantially spherical ball portion and a post that, collectively, are configured to compensate for any lateral movement of any of the components within electromagnetic locking system 400 or of electromagnetic locking system 400 altogether. Housing 208 is linearly movable within electromagnetic locking system 400, for example, along and/or parallel a longitudinal axis A2 of electromagnetic locking system 400.

The position of housing 208, and actuating arm 412 attached thereto is lockable in a variety of different positions upon excitation and/or energization of coil 214B with electrical current via wire 212. In some aspects, movement of actuating arm 412 opens and closes a valve. The valve may be locked at any desired position between being open and closed, according to a position sensor (not shown) and/or a controller (not shown). Electromagnetic locking system 400 comprises an actuator which interfaces with electromagnetic locking device 200 for locking an actuating arm 412 at any one of an infinite number of positons for providing precise position control of a movable member 108 attached thereto (e.g., a valve).

Still referring to FIGS. 4A and 4B, electromagnetic locking system 400 includes fail-safe functionality by using an unpowered device, such as a spring 408, disposed therein. In some embodiments, spring 408 is disposed within a portion of housing 208 so that, upon a loss of electrical power and/or other damage thereto, spring 408 can automatically decompress and extend to push actuating arm 412 to a fully extended position. In one non-limiting embodiment, pushing actuating arm 412 to a fully extended position opens a valve attached thereto, thereby allowing exhaust fumes to be released and/or expressed from the exhaust system. Although not shown in the figures, spring 408 may alternatively be disposed externally to housing 208 and connected thereto in order to provide the same functionality as the spring 408 is disposed within a portion of housing 208.

In some embodiments, electromagnetic locking system 400 comprises a lubricant (e.g., oil, grease) disposed at least in first chamber 402A to modify functionality of the system (i.e., to reduce 'stiction,' or the difference between the coefficients of static and dynamic friction that occurs as actuating arm 412 extends and/or decompresses between a fully extended and a fully closed position), as well as in order to improve controllability (i.e., response time) of the system. For example, a more lubricated system is capable of responding quicker because the coefficient of static friction will be similar to the coefficient of dynamic friction, thereby requiring a lower initial actuating force (e.g., generated by the pressure differential induced by the vacuum actuator) to overcome the static friction acting between magnetic core 214A and housing 208 and thereby induce movement of the actuating arm 412.

It will be appreciated that FIGS. 4A and 4B are for illustrative purposes only and that various parts, their locations, and/or their functionalities described above in relation to each FIG. may be changed, altered, added, or removed without deviating from the subject matter of the present invention.

Figure 4C:
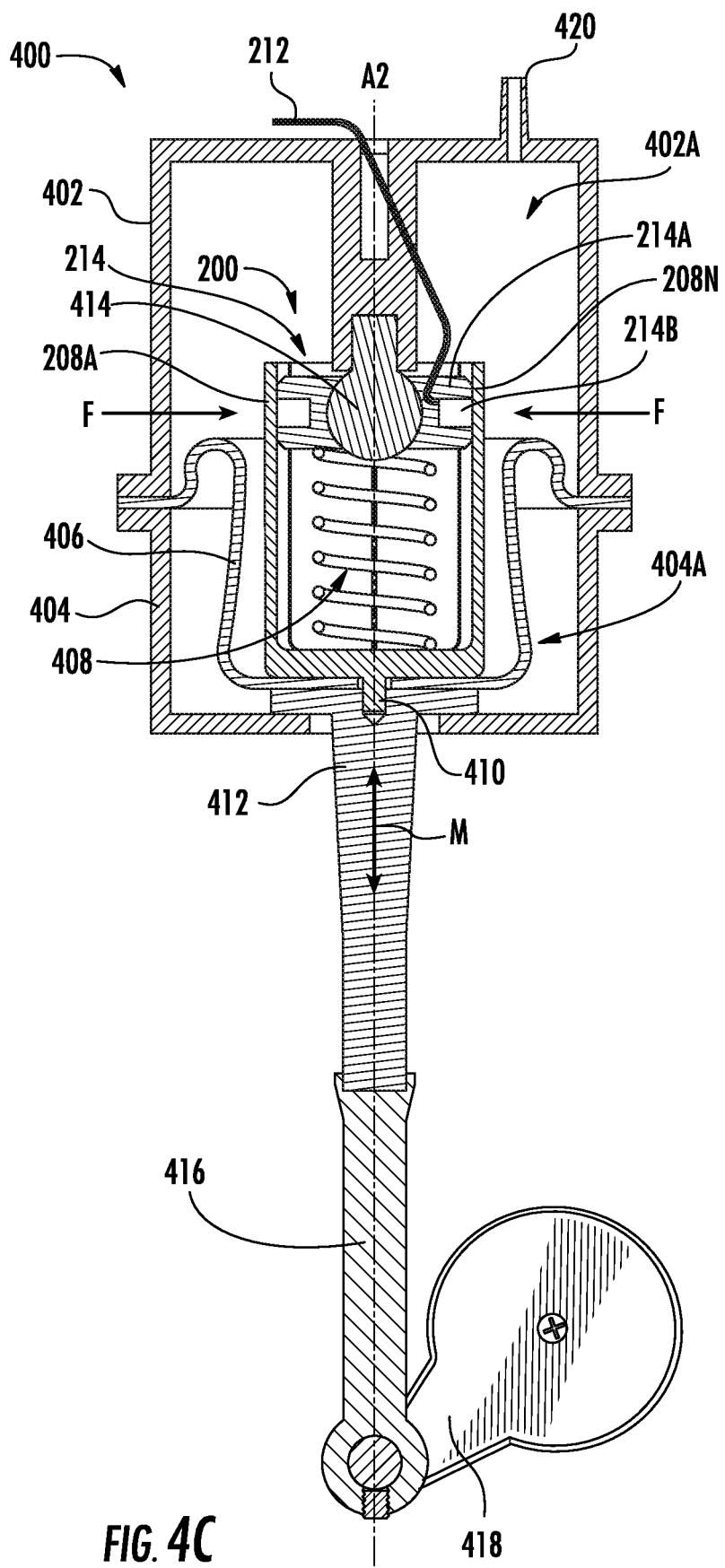
Figure 4D:
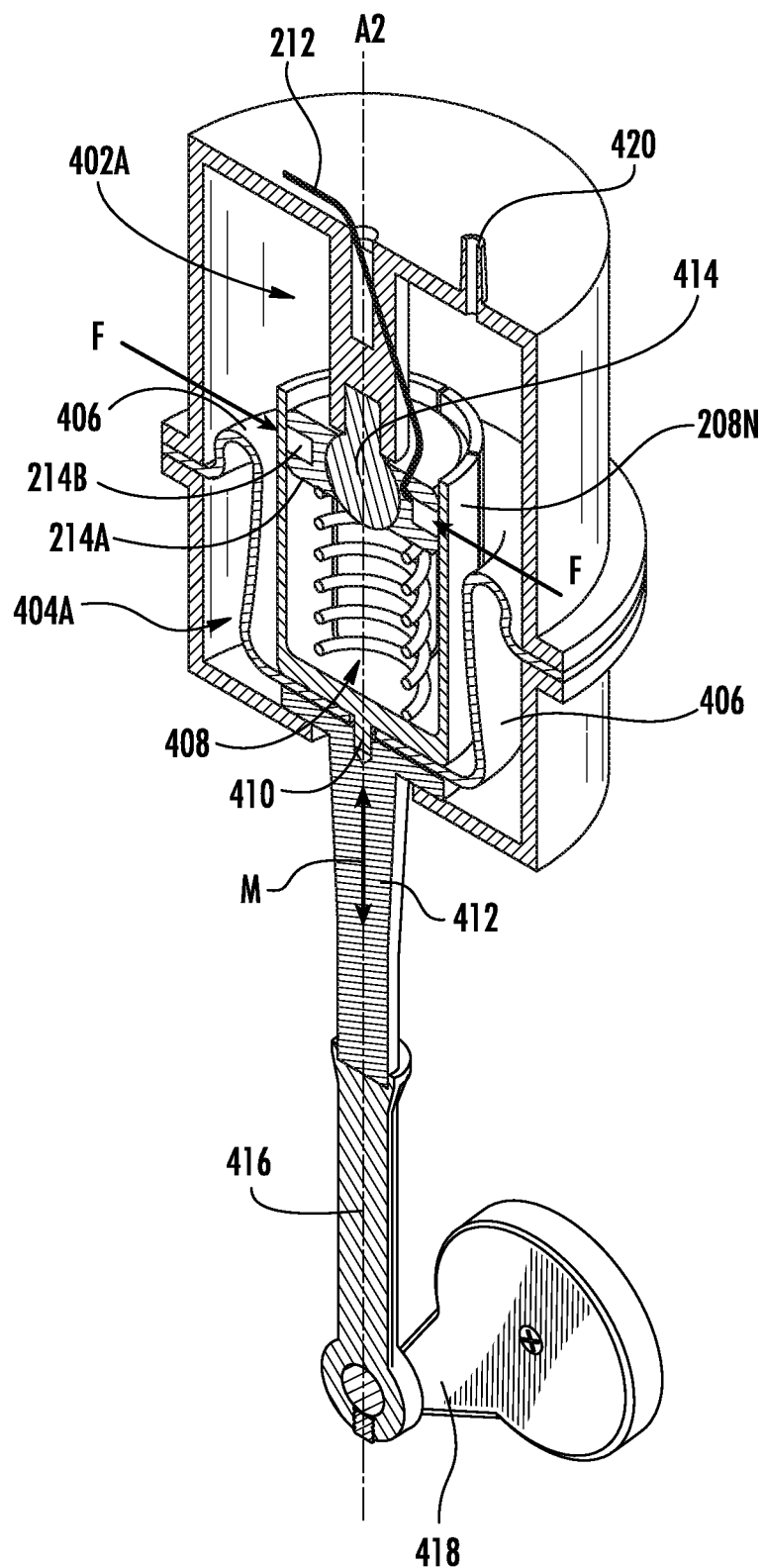

Referring now to FIGS. 4C and 4D, a further embodiment of an electromagnetic locking system 400 is illustrated. However, unlike FIGS. 4A and 4B, which illustrate actuating arm 412 being configured to attach to a movable device 108 (not shown), FIGS. 4C and 4D illustrate actuating arm 412 being configured to attach to or otherwise being integral with a connecting rod 416 of a crank-style assembly attached to movable device 108. In this configuration, movable device 108 is coupled or attached to a crank arm 418 for rotation together. For example, crank arm 418 may be coupled to an end of connecting rod 416 using any of a variety of known bearing elements that allow for relative rotation of the ends of crank arm 418 and connecting rod 416 while still converting the substantially linear translation of connecting rod 416 caused by actuating arm 412 into a rotation of crank arm 418, which correspondingly results in a rotation of movable device 108. Specifically, for example, crank arm 418 may be coupled to an end of connecting rod 416 using any of a ball joint, a pin, a yoke, a rod, a hook, or any other type of fastener or connector. Specifically, in the particular configuration shown in FIGS. 4C and 4D, and in contrast to the rack-and-pinion-style configuration of FIGS. 3C and 3D, a crank-style assembly advantageously requires no gearing, which may result in improved manufacturability of electromagnetic locking system 400.

It will be appreciated that FIGS. 4C and 4D are for illustrative purposes only and that various parts, their locations, and/or their functionalities described above in relation to each FIG. may be changed, altered, added, or removed without deviating from the subject matter of the present invention.

Figure 5A:
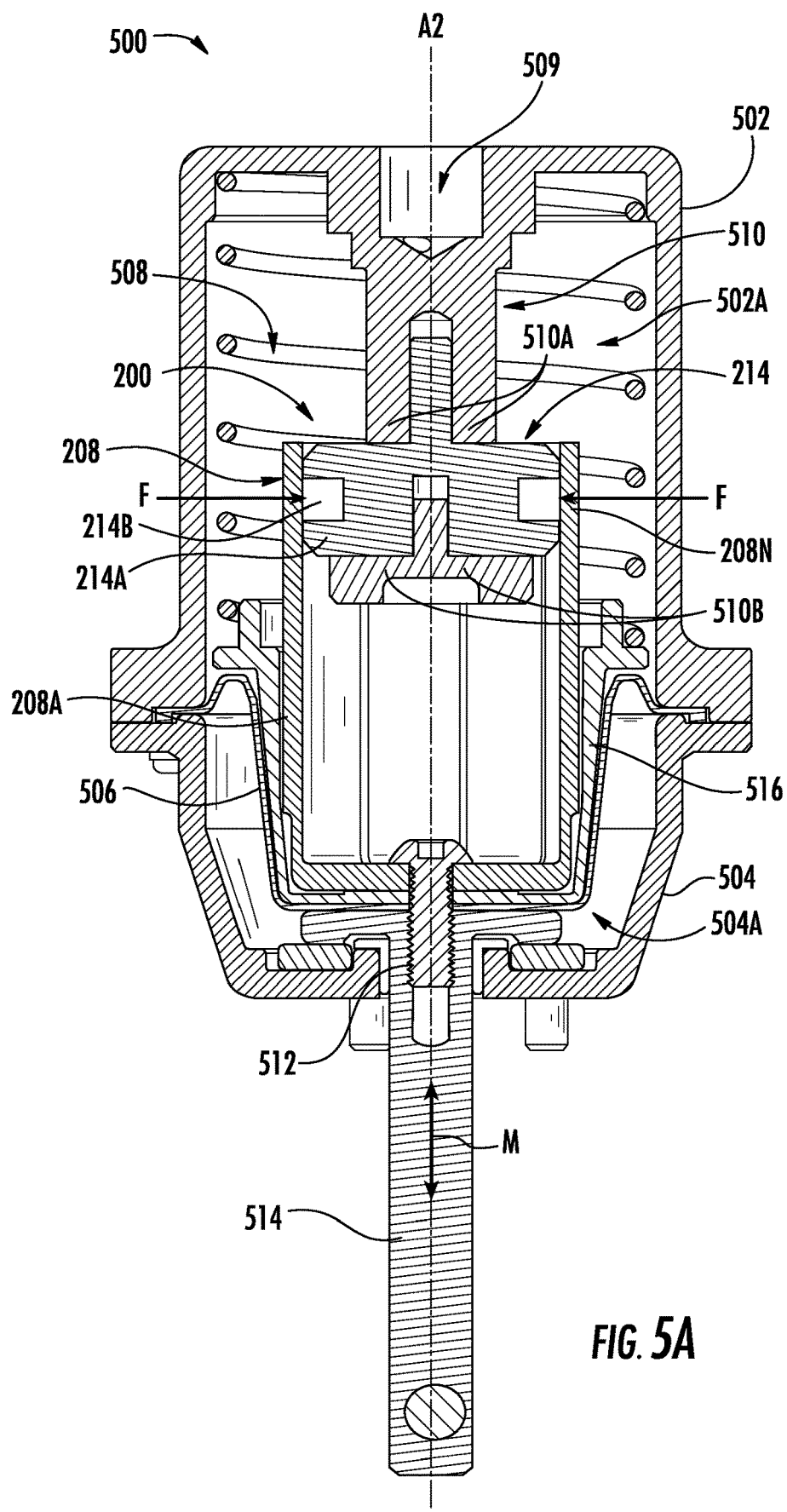
FIGS. 5A and 5B are various views illustrating a further embodiment of an electromagnetic locking device and/or system
Figure 5B:
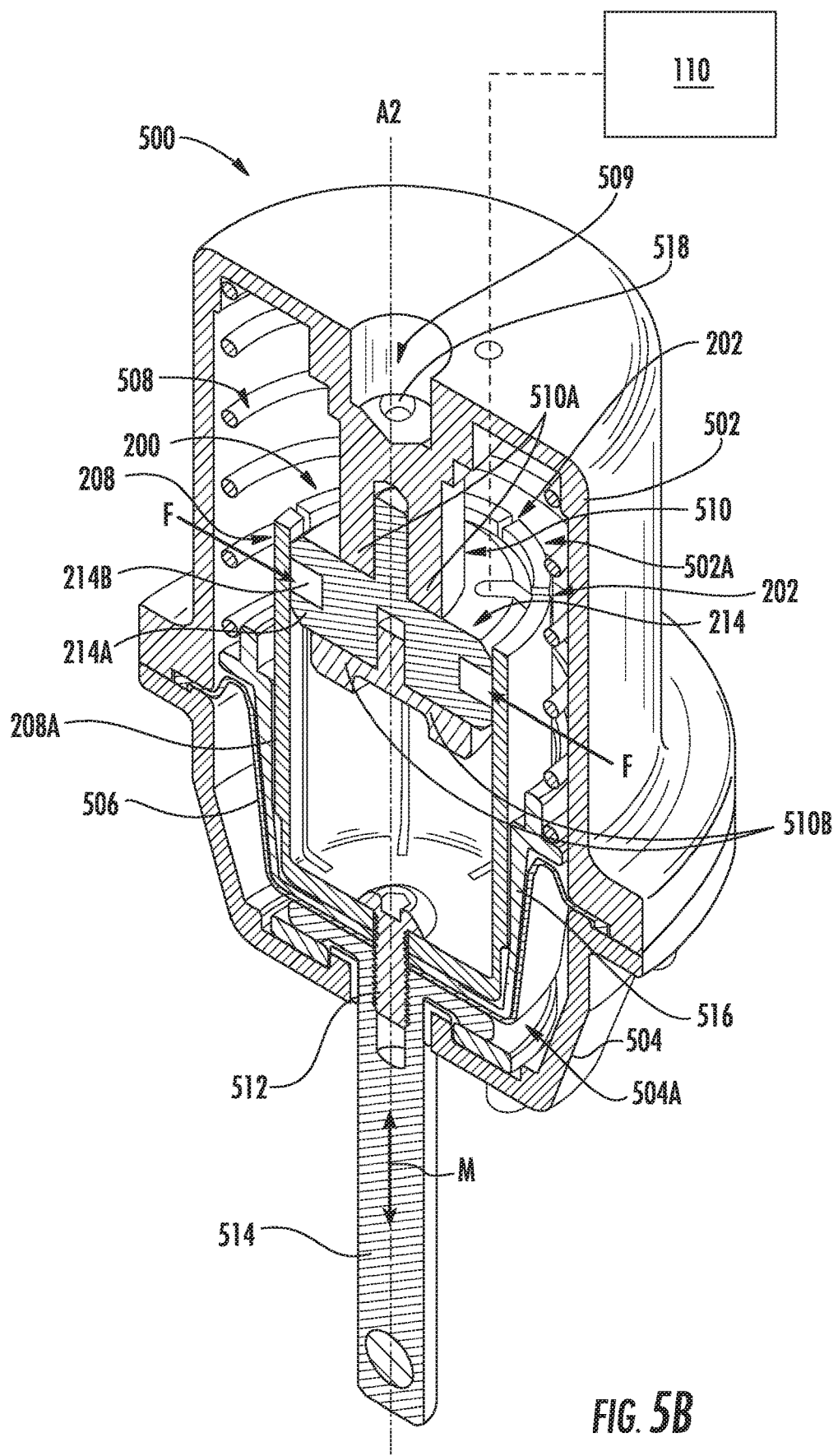

FIGS. 5A and 5B are various views illustrating a further embodiment of an electromagnetic locking system, generally designated 500. FIGS. 5A and 5B illustrate an embodiment of an electromagnetic locking system 500 having an electromagnetic locking device 200, as schematically illustrated in FIG. 1A. System 500 includes an outer cover comprising a first cover member 502 and a second cover member 504. An elastomeric diaphragm 506 is disposed between and fixed by flanges of first and second cover members 502 and 504, respectively. Elastomeric diaphragm 506 separates separate electromagnetic locking system 500, thereby defining a first chamber 502A and a second chamber 504A on either side of elastomeric diaphragm 506. According to this embodiment, first cover member 502 comprises a vacuum port 518, which is connected to a vacuum actuator (not shown), for altering a pressure inside the first chamber 502A. As a pressure differential between the first and second chambers 502A and 504A, respectively, changes, the elastomeric diaphragm 506 flexes towards whichever chamber has a lesser pressure value in order to retract or extend a driving rod attached thereto, such as an actuating arm 514. Actuating arm 514 is linearly movable (e.g., via linear motion M) with respect to the first and second cover members 502 and 504 and a longitudinal axis A2 of electromagnetic locking system 500.

Electromagnetic locking device 200 is disposed between portions of elastomeric diaphragm 506 and attached to actuating arm 514 for locking actuating arm 514 in any desired position between and including a fully extended and a fully retracted position within electromagnetic locking system 500. A proximal end of actuating arm 514 is configured to attach to a post, a fastener, or any other type of attachment member 512 extending from housing 208. According to the present embodiment, attachment member 512 is configured as a screw that extends from an inner face of planar surface 204 of housing 208, through a thickness of planar surface 204, through spring ledge 516, through elastomeric diaphragm 506, and into the proximal end of actuating arm 514. A distal end of actuating arm 514 is slidably disposed through a hole in a bottom portion of second cover member 504 and is also configured to attach to a movable device (not shown), such as a valve, or the like. Linear motion M is also referred to as a "stroke" that of actuating arm 514 and the movable device connected thereto, and is produced by linear movement of housing 208 with respect to magnetic field generator 214.

Magnetic field generator 214 comprises a magnetic core 214A and a coil 214B which is positioned about magnetic core 214A, the coil 214B being configured to generate a magnetic field when an electrical current is applied. Magnetic field generator 214 is configured to generate an electromagnetic force F upon electrical current passing to coil 214B via a wire (not shown in FIGS. 5A and 5B). The electromagnetic force F causes housing 208 to constrict and/or otherwise flex inwardly and lock or press against magnetic core 214A, as housing 208, or at least tab portions 208A through 208N, magnetically contacts magnetic core 214A. The magnitude of the electromagnetic force F generated via magnetic field generator 214 is a function of (e.g., to a point of saturation) an amount of current that passes through coil 214B, and will lock actuating arm 514 in a desired position as the frictional holding force between housing 208 and coil 214B overcomes the actuating force generated via elastomeric diaphragm 506, as vacuum actuator (not shown) varies the pressure in first chamber 502A.

In some embodiments, magnetic field generator 214 is held stationary within electromagnetic locking system 500. In other embodiments, magnetic field generator 214 is movable within electromagnetic locking system 500. Variations to the design are contemplated. In a non-limiting embodiment, magnetic field generator 214 is held stationary by center structure 510 which comprises a first ledge portion 510A and a second ledge portion 510B, each of which are integrally formed with, or otherwise affixed to, first cover member 502. First and second ledge portions 510A and 510B are disposed within and/or below a portion of a cavity 509. Housing 208 is linearly movable within electromagnetic locking system 500, for example, along and/or parallel a longitudinal axis A2 of electromagnetic locking system 500.

The position of housing 208 and actuating arm 514 attached thereto is lockable in a variety of different positions upon excitation of coil 214B. In some aspects, movement of actuating arm 514 opens and closes a valve. The valve may be locked at any desired position between and including a fully open and a fully closed position, according to a position sensor (not shown) and/or controller (not shown). Electromagnetic locking system 500 comprises an actuator which interfaces with electromagnetic locking device 200 for locking an actuating arm 514 at any one of an infinite number of positons for providing precise position control of a movable member attached thereto (e.g., a valve).

Still referring to FIGS. 5A and 5B, electromagnetic locking system 500 includes fail-safe functionality via provision of an unpowered spring 508 contained therein. In some embodiments, spring 508 is disposed external to housing 208 such that a first end of spring 508 is positioned on spring ledge 516 and a second end of spring 508 is positioned on an upper wall of first cover member 502, the spring being compressed therebetween during assembly. Spring ledge 516 is configured such that spring ledge 516 is attached or otherwise affixed to housing 208 via attachment member 512. In this manner, upon a loss of electrical power and/or other damage thereto, spring 508 automatically decompresses and extends against spring ledge 516 to push spring ledge 516 down along a same direction as longitudinal axis A2 of electromagnetic locking system 500, thus pushing actuating arm 514 to a fully extended position. In one non-limiting embodiment, pushing actuating arm 514 to a fully extended position opens a valve attached thereto, and allows gases (e.g., exhaust fumes) to be released and/or expressed from the exhaust system automatically, even in the event of malfunction or power loss.

In some embodiments, electromagnetic locking system 500 comprises a lubricant (e.g., oil, grease) disposed at least in first chamber 502A to modify functionality of the system (i.e., to reduce 'stiction,' or the difference between the coefficients of static and dynamic friction that occurs as actuating arm 514 extends and/or decompresses between a fully extended and a fully closed position), as well as in order to improve controllability (i.e., response time) of the system. For example, a more lubricated system is capable of responding quicker because the coefficient of static friction will be similar to the coefficient of dynamic friction, thereby requiring a lower initial actuating force (e.g., generated by the pressure differential induced by the vacuum actuator) to overcome the static friction acting between magnetic core 214A and housing 208 and thereby induce movement of the actuating arm 514.

It will be appreciated that FIGS. 5A and 5B are for illustrative purposes only and that various parts, their locations, and/or their functionalities described above in relation to each FIG. may be changed, altered, added, or removed without deviating from the subject matter of the present invention.

Figure 6A:
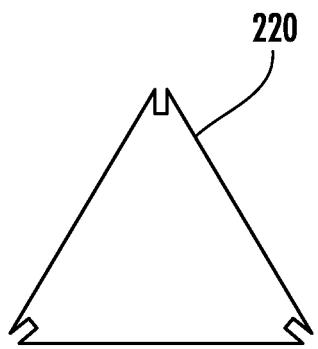
FIGS. 6A through 6E are cross-sections illustrating various embodiments of a housing of an electromagnetic locking device.
Figure 6B:
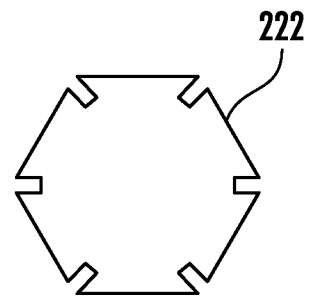
Figure 6C:
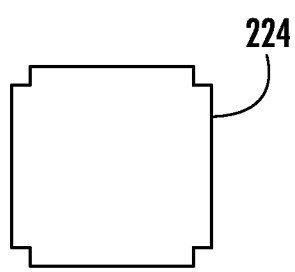
Figure 6D:
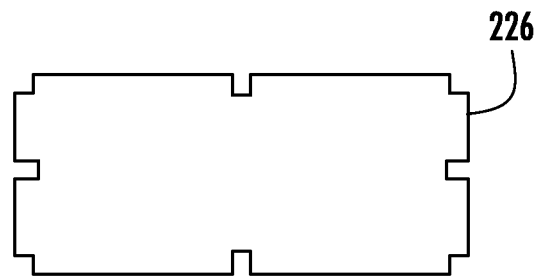
Figure 6E:
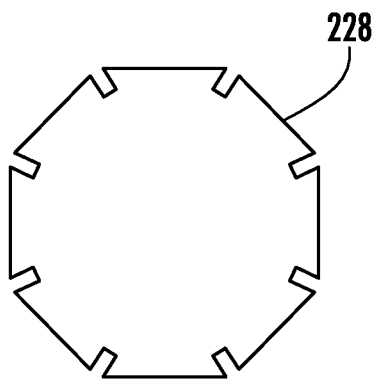

Referring now to FIGS. 6A through 6E, cross-sections of various embodiments of housing 208 as well as of magnetic field generator 214, magnetic core 214A, and coil 214B of an electromagnetic locking device 200 are illustrated. In some embodiments, the cross-sections of a housing 208 and/or a magnetic field generator 214 of an electromagnetic locking device 200 are exemplary of the electromagnetic locking device 200 having a housing 208 and magnetic field generator 214 as illustrated in FIGS. 2A to 2C. As illustrated in FIGS. 2A to 2C, housing 208 comprises a substantially cylindrical or tubular hollow member, such that a circular cross-section results, while magnetic field generator 214 comprises a complementary shape in substantially a same shape as the cross-section of housing 208. However, alternative shapes of a cross-section of housing 208 are provided in reference to FIGS. 6A through 6E, which show schematic top views for a triangular housing 220 with a triangular cross-section (FIG. 6A), a hexagonal housing 222 with a hexagonal cross-section (FIG. 6B), a square housing 224 with a square cross-section (FIG. 6C), a rectangular housing 226 with a rectangular cross-section (FIG. 6D), and an octagonal housing 228 with an octagonal cross-section (FIG. 6E). Other cross-sectional shapes are also contemplated. Additionally, as illustrated in each of the embodiments in FIGS. 6A to 6E, a plurality of slots (e.g., slots 202, FIG. 2A) are disposed at regular or irregular intervals about the circumference of the housing, regardless of the cross-sectional shape in which the housing is formed.

Figure 7:
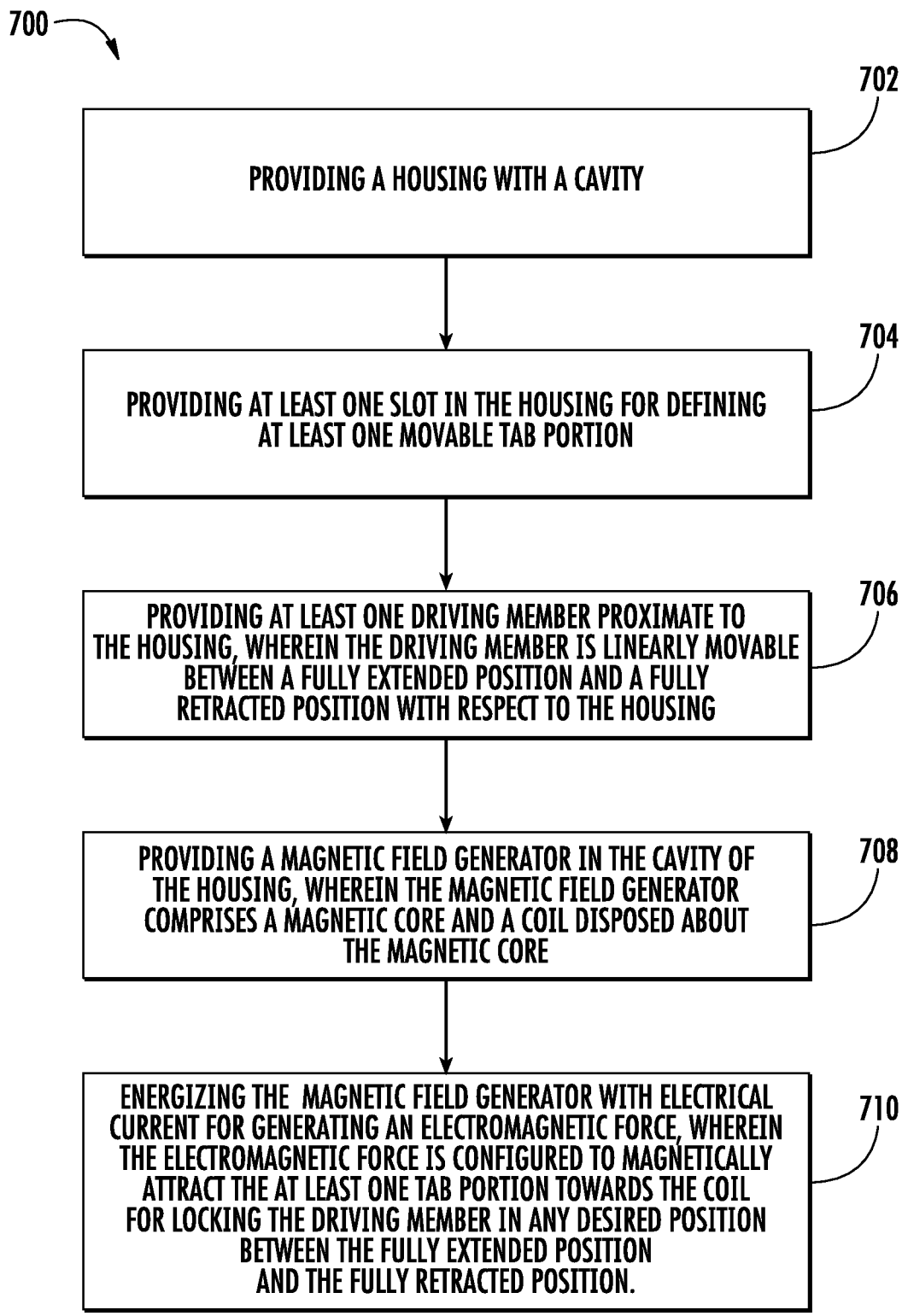
FIG. 7 is a block diagram of an exemplary method for electromagnetic locking devices and/or systems.

FIG. 7 is a block diagram of an exemplary method 700 for locking a driving member via an electromagnetic locking device (assembly) and/or system. In block 702, a housing comprising a cavity and/or an opening is provided. The opening or cavity is configured to receive at least one magnetic field generator. The housing may also include a substantially solid planar surface at one end and a substantially open end at a second end.

In block 704, at least one slot is provided in the housing for defining at least one movable tab portion.

In block 706, at least one driving member (e.g., a driving rod, an actuating member, an actuating arm, a piston, or the like) is provided proximate to the housing. The driving member is linearly movable between and including a fully extended position and a fully retracted position with respect to the housing.

In block 708, a magnetic field generator is provided in the cavity of the housing. The magnetic field generator includes a magnetic core and a coil disposed about the magnetic core.

In block 710, the magnetic field generator is energized with electrical current for generating a magnetic field. The magnetic field magnetically attracts the at least one tab portion towards the coil for locking the driving rod in any desired position between and including the fully extended position and the fully retracted position.

Other embodiments of the current subject matter will be apparent to those skilled in the art from a consideration of this specification or practice of the subject matter disclosed herein. Thus, the foregoing specification is considered merely exemplary of the current subject matter with the true scope thereof being defined by the following claims.

What is claimed is:

1. An electromagnetic locking system, the system comprising:
an outer cover comprising a first cover member and a second cover member;
an elastomeric diaphragm disposed between the first and second cover members, thereby defining first and second chambers, one on each side of the elastomeric diaphragm;
a spring ledge secured between an inner edge of the elastomeric diaphragm and a planar surface of a housing;
a spring comprising a first end which is positioned on the spring ledge and a second end is positioned on an upper wall of the first cover member;
an actuating arm;
a magnetic field generator affixed to a center structure comprising first and second ledge portions which are integral with, or otherwise attached to, the first cover member, the magnetic field generator comprising a magnetic core and a coil which is positioned about the magnetic core, the coil being configured to generate a magnetic field when an electrical current is applied;
a housing having a center axis, a substantially covered first end in a shape of a planar surface, a substantially open second end, and walls comprising a plurality of slots longitudinally positioned through at least a portion of the housing wall, thereby defining a plurality of movable tab portions, the housing being of a magnetically responsive material; and
an electrical input/output (I/O) connection configured to provide the electrical current to the coil;
wherein a proximal end of actuating arm is attached to an attachment member and wherein a distal end of actuating arm is slidably disposed through a hole in a bottom of second cover member;
wherein the magnetic field magnetically attracts the plurality of movable tab portions towards the coil to generate a frictional force to brake any movement of the actuating arm.

2. An electromagnetic locking system comprising:
a first cover member;
a center structure rigidly secured to the first cover member, the center structure comprising first and second ledge portions;
a magnetic field generator affixed to the center structure, the magnetic field generator comprising a magnetic core with a coil positioned about the magnetic, the coil being configured to generate a magnetic field when an electrical current is applied;
a housing having side walls, a bottom planar surface, and a center axis, the side walls extending from the planar surface with the housing opening upward, wherein the side walls are proximately positioned around the magnetic field generator, the side walls being movable relative to the coil, wherein the side walls comprise a plurality of slots which are longitudinally positioned through at least a portion of the side walls, thereby defining a plurality of movable tab portions, and wherein the housing comprises a magnetically responsive material;
a spring disposed within the housing between second ledge portion and the planar surface of the housing;
an attachment member affixed to a bottom surface of the planar surface, the attachment member being aligned with the center axis;
a second cover member surrounding at least a portion of the housing;
an elastomeric diaphragm disposed between the first and second cover members, the attachment member extending through and below the elastomeric diaphragm;
an actuating arm attached to the attachment member and extending through the second cover member; and
an electrical input/output (I/O) connection configured to provide an electrical input to the coil, wherein the magnetic field is configured to magnetically attract the plurality of movable tab portions towards the magnetic field generator to generate a frictional force, wherein the frictional force brakes any movement of the housing.

* * * * *